United States Patent
Wild et al.

(10) Patent No.: US 9,689,958 B1
(45) Date of Patent: Jun. 27, 2017

(54) DEVICE POSITIONING USING ACOUSTIC AND RADIO SIGNALS

(71) Applicants: Ben Wild, Belmont, CA (US); Robert A Barton, Mountain View, CA (US)

(72) Inventors: Ben Wild, Belmont, CA (US); Robert A Barton, Mountain View, CA (US)

(*) Notice: Subject to any disclaimer, the term of this patent is extended or adjusted under 35 U.S.C. 154(b) by 393 days.

(21) Appl. No.: 14/201,897

(22) Filed: Mar. 9, 2014

Related U.S. Application Data

(60) Provisional application No. 61/949,231, filed on Mar. 6, 2014, provisional application No. 61/830,655, filed on Jun. 4, 2013, provisional application No. 61/808,141, filed on Apr. 3, 2013.

(51) Int. Cl.
*G01S 15/00* (2006.01)
*G01S 3/80* (2006.01)
*G01S 3/802* (2006.01)

(52) U.S. Cl.
CPC ............ *G01S 3/8003* (2013.01); *G01S 3/802* (2013.01)

(58) Field of Classification Search
CPC ........... G01S 3/8003; G01S 3/802; G01S 5/24
USPC .......................................... 367/99, 118, 125
See application file for complete search history.

(56) References Cited

U.S. PATENT DOCUMENTS

| 5,493,308 | A  | * | 2/1996  | Bingham ............... | G01S 5/06 342/442 |
| 7,796,471 | B2 | * | 9/2010  | Guigne ................... | G01S 5/22 367/125 |
| 8,509,030 | B2 | * | 8/2013  | Napolitano ........... | G01S 1/80 367/127 |
| 8,767,511 | B2 | * | 7/2014  | Pennec ................. | G01S 3/8083 367/128 |
| 8,908,475 | B2 | * | 12/2014 | Napolitano ........... | G01S 1/763 367/118 |
| 2011/0038230 | A1 | * | 2/2011 | Napolitano ........... | G01S 1/80 367/127 |
| 2012/0106380 | A1 | * | 5/2012 | Vaidyanathan ........ | G01S 1/024 370/252 |

* cited by examiner

*Primary Examiner* — Mark Hellner
(74) *Attorney, Agent, or Firm* — Ronald L. Rohde

(57) ABSTRACT

The present technology may be directed a system for determining an angle and distance between a positioning node and secondary device using a plurality of acoustic transmitters to transmit acoustic ranging signals that are modulated using ranging sequences, respectively. The system includes an acoustic receiver to detect the acoustic ranging signals, and a signal processor to calculate times of arrival and a plurality of aliased angles of arrival of the acoustic ranging signals. An anti-aliasing module may select an angle of arrival from the calculated plurality of aliased angles using the times of arrival of the acoustic ranging signals. A time of flight may be calculated from a comparison of times of arrival for radio signals and the acoustic signals. The time of flight may be used to calculate the distance between the positioning node and secondary device.

30 Claims, 15 Drawing Sheets

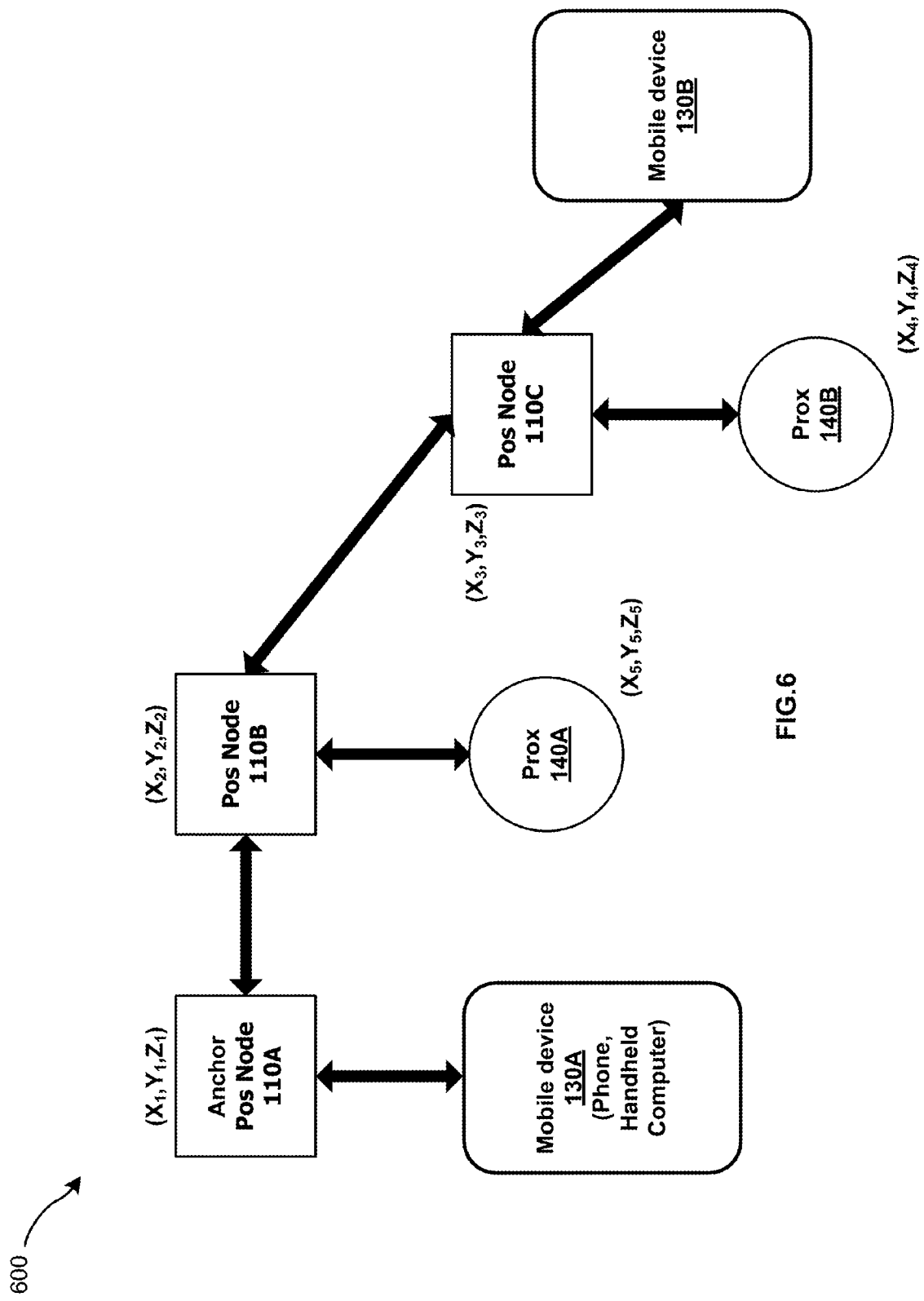

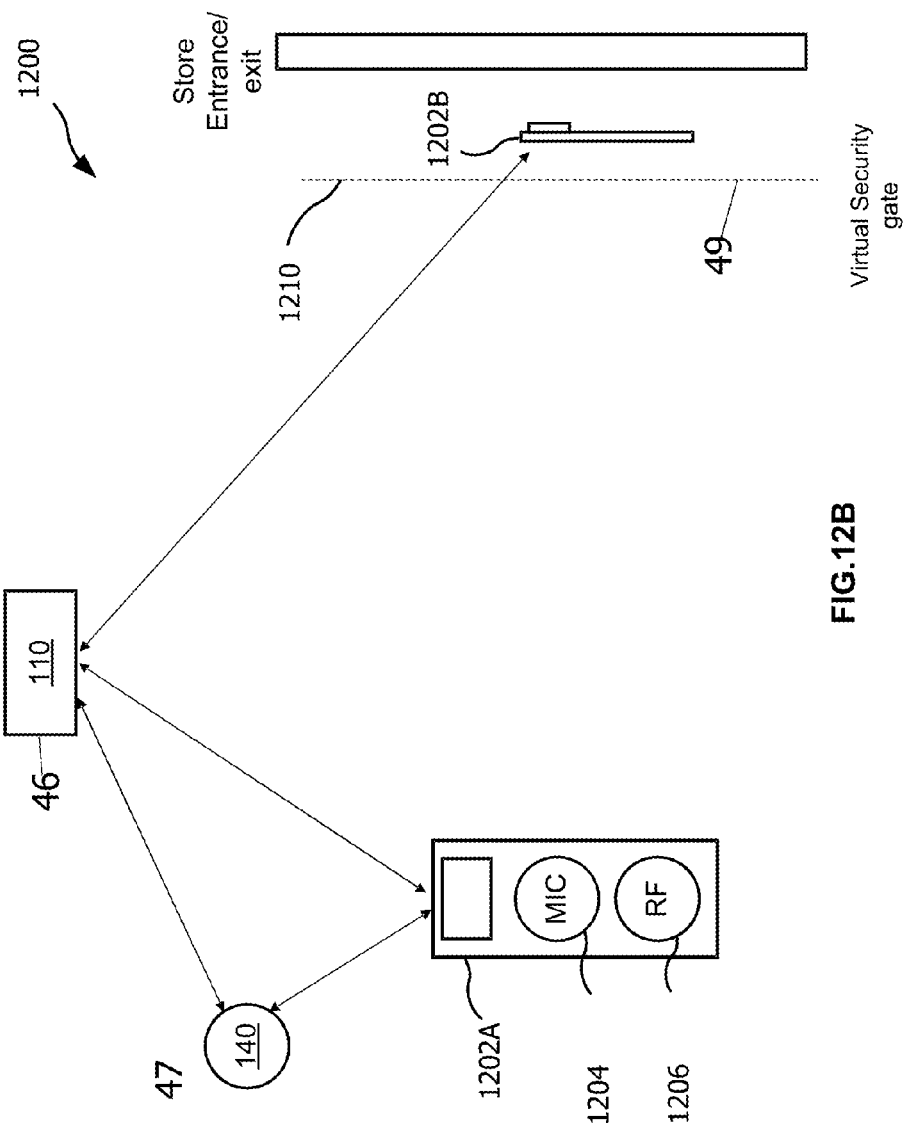
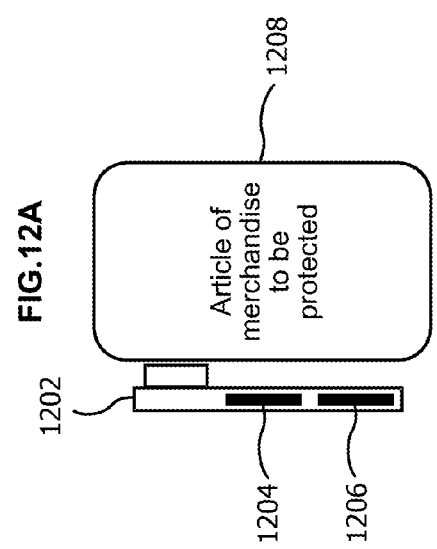
FIG.12B
FIG.12A

DEVICE POSITIONING USING ACOUSTIC AND RADIO SIGNALS

CROSS REFERENCE TO RELATED APPLICATIONS

The present application claims priority benefit from U.S. provisional patent application No. 61/803,655 filed Mar. 20, 2013 and titled "Self-calibrating, hybrid radio-acoustic indoor positioning and mapping system," U.S. provisional patent application No. 61/808,141 filed Apr. 3, 2013 and titled "Automatic indoor mapping and planogram generation system and methods," and U.S. provisional patent application No. 61/949,231 filed Mar. 6, 2014 and titled "DEVICE POSITIONING USING ACOUSTIC AND RADIO SIGNALS," the disclosures of all of which are incorporated by reference herein in their entirety.

FIELD OF THE PRESENT TECHNOLOGY

The present technology relates generally to determining device positions using acoustic and radio frequency signals.

BACKGROUND

The Global Positioning System (GPS) has been a revolutionary technology that has made a significant impact on people's lives. Using a smartphone, a person is easily able to navigate anywhere on earth. The only drawback is that GPS does not work well indoors due to the weak signals emitted from the GPS satellites. There is, thus, a need for a positioning system to complement GPS and provide the ability to locate smartphones as well as other assets indoors. Significant research and development has been conducted in use of location systems based on radio frequency (RF). State of the art technologies use a combination of radio waves emitted from WiFi access points and/or Bluetooth beacons. In addition, if the device to be located has an accelerometer and gyroscope, dead reckoning can be performed when these radio signals are temporarily not present. Although this solution works in certain cases, there are several disadvantages with this approach. The first is that indoor environments tend to reflect radio waves creating multiple radio paths to a receiver. There are three typical approaches used to locate devices using radio waves. These are time of arrival (ToA), angle of arrival (AoA) and received signal strength (RSS). The multipath problem impacts the positioning accuracy attainable when using any of the three above positioning techniques. The multipath problem causes significant problems for radio based positioning networks since radio waves travel at the speed of light. When multipath reflections arrive at a radio receiver, they arrive at almost the same time, making it very difficult to resolve the paths.

One way to improve the positioning accuracy is to place more radio beacons in the environment. This approach while improving performance is more expensive. It is also more difficult to calibrate the entire network, since the location of all of the beacons needs to be known before the network can be used to position other devices.

Another promising technology that has been proposed for indoor positioning is using acoustic based measurements. Acoustic based positioning is promising since acoustic waves in air travel at only 340 m/S, approximately a million times slower than radio waves. This makes it much easier to obtain precise positioning and resolve multipath. In this approach, it is typical for several acoustic emitters, each emitting different signals to be placed at known locations in a room. It is typical for frequencies above 20 KHz to be used which is above the audible range. A microphone is used on the receiving end to measure the time of flight from each of these speakers. Using the time of flight and known speaker positions, the receiving device can figure out its position. When each speaker emits an audio signal, it can also emit a radio signal indicating when the speaker started emitting the audio signal. The receiving device can use the difference in arrival time of the radio signal and audio signal to compute the times of flight of the audio waves. There are three drawbacks with this approach. The first is that a significant number of speakers distributed over an area are typically required to cover the area since a device to be positioned needs to hear the sound signals from at least three or four different speakers. The second problem is that sound waves, especially higher frequencies, tend to not be able to penetrate walls and other obstructions. The 3rd problem, which is shared with the RF based approach, is that all speaker positions need to be calibrated before they can be used for positioning.

SUMMARY

According to some embodiments, the present technology may be directed to a system for determining an angle between a positioning node and a secondary device that includes a first acoustic transducer disposed along a first axis of the positioning node and coupled to a first acoustic ranging signal that is modulated using a first ranging sequence, the first acoustic transducer configured to transmit the first acoustic ranging signal to the secondary device and a second acoustic transducer disposed along the first axis of the positioning node and coupled to a second acoustic ranging signal that is modulated using a second ranging sequence, the second acoustic transducer configured to transmit the second acoustic ranging signal to the secondary device. The system further includes an acoustic receiver disposed on the secondary device and configured to detect the first and second acoustic ranging signals. The system also includes a signal processor configured to calculate a phase difference between the first and second acoustic ranging signals using the first and second acoustic ranging sequences, and to calculate a time of arrival of the first and second acoustic ranging signals. The system further includes an anti-aliasing module configured to calculate a plurality of aliased angles of arrival using the calculated phase difference, and to determine the angle between the positioning node and the secondary device from the plurality of angles of arrival using a difference between the time of arrival of the first and second acoustic ranging signals.

According to some embodiments, the present technology may be directed to a method for determining an angle between a positioning node and a secondary device. The method includes receiving at an acoustic receiver on the secondary device a first ranging signal from a first transducer disposed on the positioning node, the first ranging signal having a first acoustic sequence, and receiving at the acoustic receiver a second ranging signal from a second transducer disposed on the positioning node using, the second ranging signal having a second acoustic sequence. The method further includes calculating a phase difference between the first and second ranging signal based on the first and second acoustic sequence, the phase difference calculated using a signal processor. A time of arrival of the first and second acoustic ranging signals may be calculated using the signal processor. A plurality of potential angles between the secondary device and a first axis of the positioning node may be calculated based on the calculated phase difference. The method further includes selecting an angle from the plurality of potential angles using a difference between the calculated time of arrival of the first and second ranging signals.

According to some embodiments, the present technology may be directed to a system including a plurality of positioning nodes. Each positioning node includes a first acoustic transducer configured to transmit a first acoustic ranging signal that is modulated using a first ranging sequence, and a second acoustic transducer configured to transmit a second acoustic ranging signal that is modulated using a second ranging sequence. Each node further includes an acoustic receiver configured to detect a first and second ranging signals from another of the positioning node that is displaced an unknown distance and angle away, and a radio transceiver configured to send and receive radio signals for communication with the displaced positioning node. Each node also includes a signal processor configured to use the first and second acoustic ranging sequences to calculate a time of arrival of the detected first and second acoustic ranging signals and a phase difference between the first and second acoustic ranging signals, the signal processor further configured to calculate a plurality of aliased angles of arrival using the calculated phase difference. Each node further includes an anti-aliasing module configured to use a difference between the time of arrival of the first and second acoustic ranging signals to select an angle of arrival from the plurality of aliased angles of arrival. Each node also includes a position processor configured to use a difference between a time of arrival of radio signals received from the displaced positioning node and the time of arrival of the first and second acoustic ranging signals to calculate a distance to the displaced positioning node, the position processor further configured to calculate a position of the positioning node relative the displaced positioning node using the calculated distance and angle of arrival.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 6 is a block diagram of an infrastructure 600 for performing self calibration, in accordance with aspects of the technology.

FIG. 12A is a block diagram illustrating a positioning hard tag, in accordance with aspects of the technology.

FIG. 12B is a block diagram illustrating a positioning hard tag disposed in a positioning network, in accordance with aspects of the technology.

DETAILED DESCRIPTION

Figure 1:
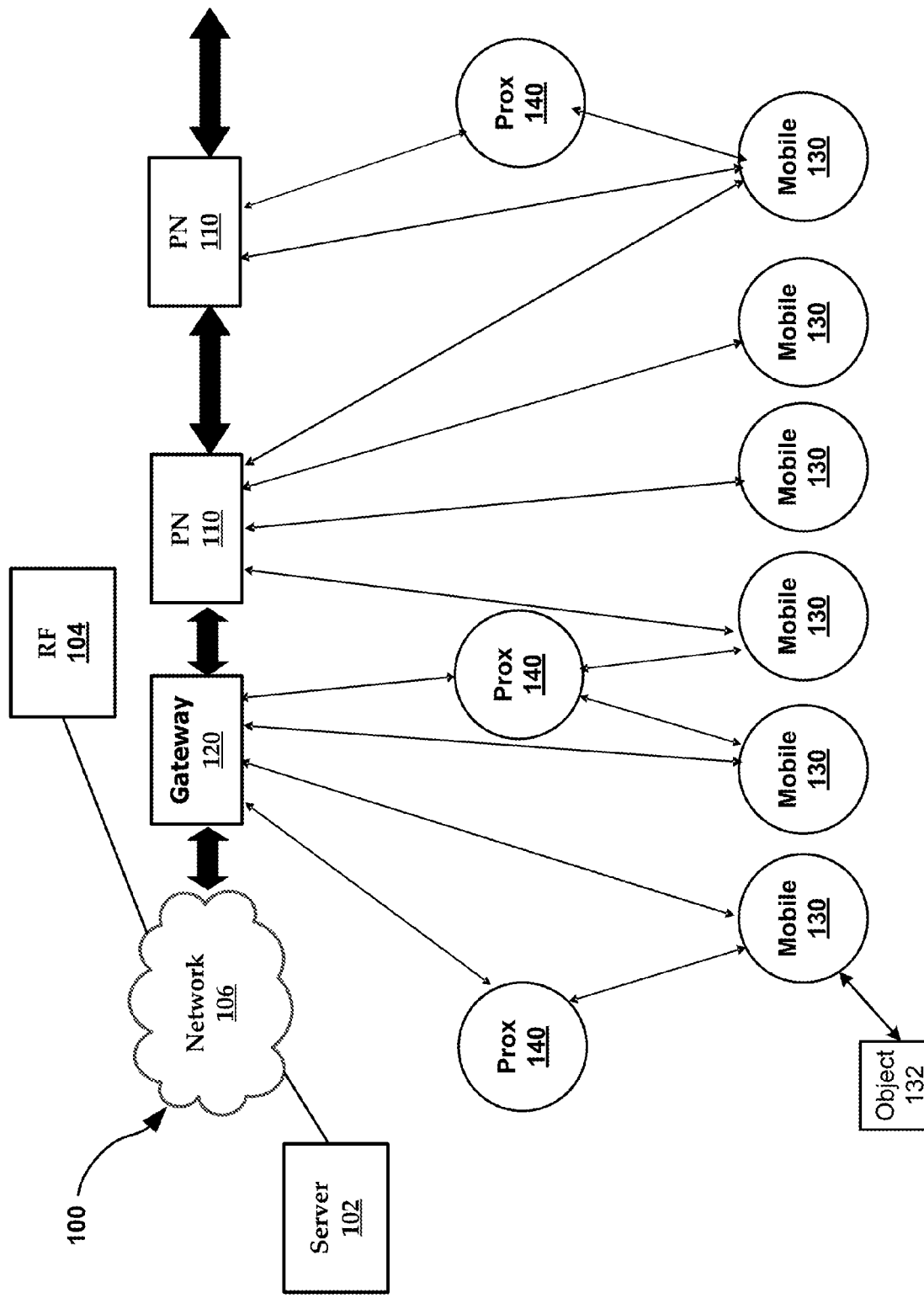
FIG. 1 is a block diagram of an exemplary positioning network architecture 100, in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity. The term RF as used for information communication including transmission and reception of information, is intended to apply not only to radio frequency electromagnetic radiation, but also to infrared, visible light, ultraviolet, microwave, and other forms of electromagnetic radiation.

A hybrid acoustic/RF positioning system may be used to provide an accurate, reliable, and low cost positioning system. Additionally, the hybrid acoustic/RF positioning system is capable of self-calibration. Thus, very little information is needed to be entered about the position of each node that is part of the positioning infrastructure. Another benefit is that the system may be used for automatically generating a map of an environment. These and other advantages of the present technology are provided in greater detail with reference to the drawings.

FIG. 1 is a block diagram of an exemplary positioning network architecture 100, in which embodiments of the present technology may be practiced. The positioning network architecture 100 includes a server 102, an RF transceiver 104, a network 106, positioning nodes 110, a gateway node 120, proximity nodes 140, mobile devices 130, and objects 132.

According to some embodiments, the RF transceiver 104, positioning nodes 110, gateway node 120, proximity nodes 140, mobile devices 130, and/or objects 132 are communicatively coupled with the server 102 via a network 115, which may comprise any a local area network ("LAN"), a wide area network ("WAN"), or any other private or public network, such as the Internet. The network 115 may also comprise a telecommunications network.

Figure 19:
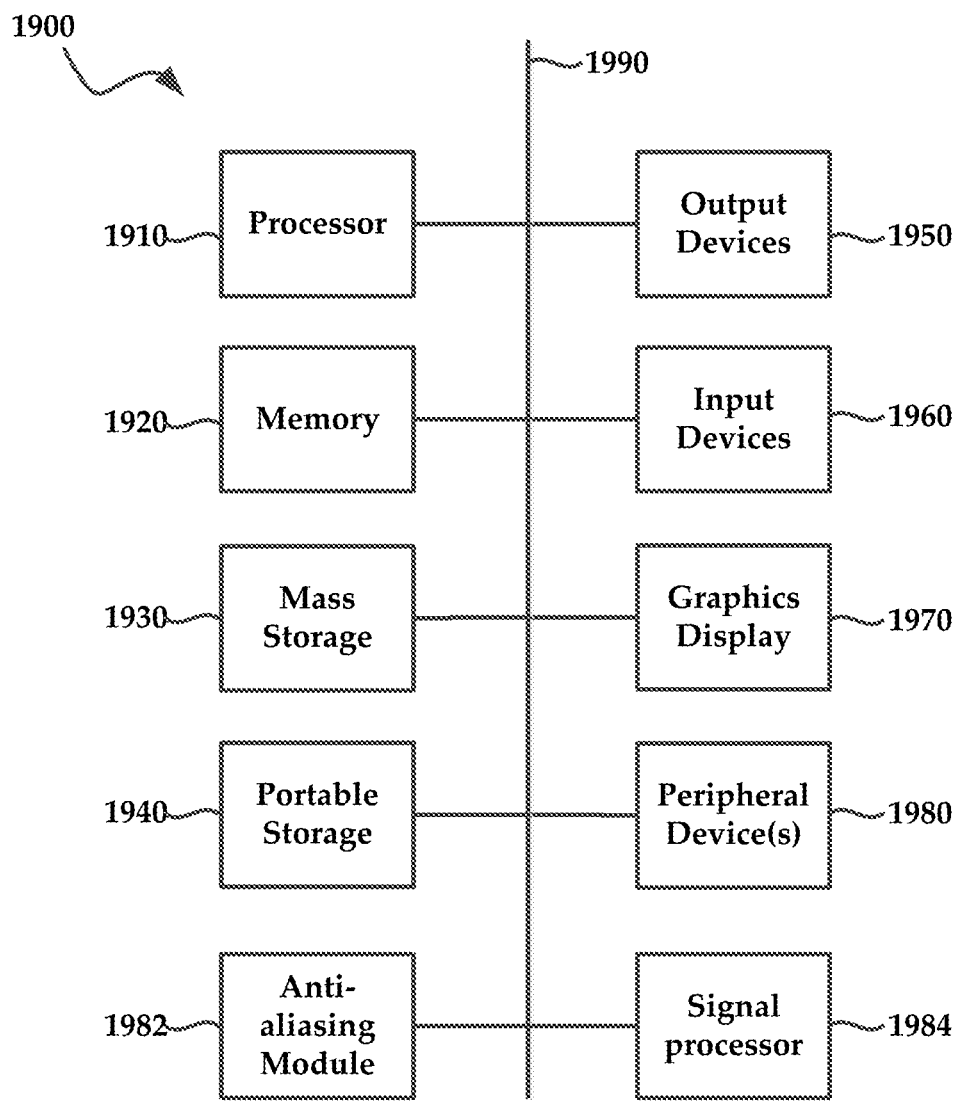
FIG. 19 illustrates an exemplary computing device that may be used to implement an embodiment of the present systems and methods.

According to some embodiments, the server 102 comprises any computing device, such as the computing device 1900 of FIG. 19 (discussed in more detail elsewhere herein). The server 102 includes one or more processors such as the one or more processors 1910 of FIG. 19, and memory for storing executable instructions (e.g., logic) such as the main memory 1920 of computing device 1900. This logic, when executed by the one or more processors, is operable to perform operations, including the exemplary methods described herein.

In some instances, the functions of the server 102 may be implemented within a cloud-based computing environment (not illustrated). In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the server 102 may execute logic stored in memory to facilitate a method for control and determining positions of the client devices. Generally, the server 102 may execute logic via the one or more processors on the server 102 and/or on board the client devices to calculate positions based on the transmission and reception of acoustic ranging signals and protocol RF information communicated via RF signals. In some instances, the server 102 may cause acoustic ranging signals and/or protocol RF information to be transmitted and/or received by one or more of the client devices. It will be understood that the server 102 may "cause" transmission and/or reception of the acoustic ranging signals and/or RF signals by transmitting signals to the client devices via the RF transceiver 104 and/or the network 106, that cause the client devices to provide, for example, acoustic ranging signals for positioning and protocol RF information communicated via RF signals for control and timing of the client devices. In various embodiments, RF refers to electromagnetic radiation including radio frequencies, infrared, visible light, ultraviolet, microwave, and/or the like.

In various embodiments, positioning nodes 110 are configured to stand-alone and/or function as a gateway 120 to the network 106. The positioning nodes 110 may be configured to transmit and receive acoustic waves as well as radio waves. The acoustic and/or radio waves may be used for computing a position of the mobile devices 130. In various embodiments, the mobile devices 130 include mobile phones, assets, robots, and/or the like. Each mobile device 130 may be configured to calculate its own position. The positioning nodes 110 may transmit and/or receive messages via acoustics and/or radio for communication with other positioning nodes 110, gateways 120, proximity nodes, and/or mobile devices. In some embodiments, the messages are used for self calibration within the positioning network architecture 100, The messages may also be used for network protocol, operations, and communications, such as timing and control, identification, security, diagnostics, inventory, environmental measurements, and/or the like.

The proximity nodes 140 are configured to transmit and/or receive acoustic waves as well as transmit and/or receive radio signals. In various embodiments, the proximity nodes 140 are used in aiding in the positioning process of mobile devices 130 using radio based positioning approaches, such as radio RSS, ToA, AoA and/or the like. The proximity nodes 140 may use on board microphone(s) for determining their own position, using the positioning nodes 110. The gateway 120, RF transceiver 104 and/or positioning nodes 110 may be in communication with the server 102 directly, and/or via the network 106.

Mobile devices 130 are configured to transmit and/or receive acoustic waves as well as transmit and/or receive radio signals. In various embodiments, the mobile devices 130 are used in aiding in the positioning process of mobile devices 130 using radio based positioning approaches, such as radio RSS, ToA, AoA and/or the like. The mobile devices 130 may use on board microphone(s) for determining their own position, using the positioning nodes 110. In various embodiments, mobile devices include mobile phones, tablets, iPads, iPods, netbooks, GPS receivers, vehicles, laptops, robots, aircraft, wheel chairs, hand trucks, carts, pets, dogs, cats, asset tracking tags, and/or the like.

The RF transceiver 104 is configured to provide RF communication between positioning nodes 110, gateways 120, mobile devices 130, and/or proximity nodes 140. In various embodiments wireless communications includes Wi-Fi, Bluetooth, Zigbee, and/or the like.

Objects 132 include items in close proximity to mobile devices 130 (typically line of sight) that are subject to being detected, identified and/or tracked using the mobile devices 130. In various embodiments, objects include merchandise, inventory, equipment, tools, books, documents, and/or the like. Objects may be detected, identified and/or tracked using barcodes, optical recognition, RFID, and/or the like.

Figure 2A:
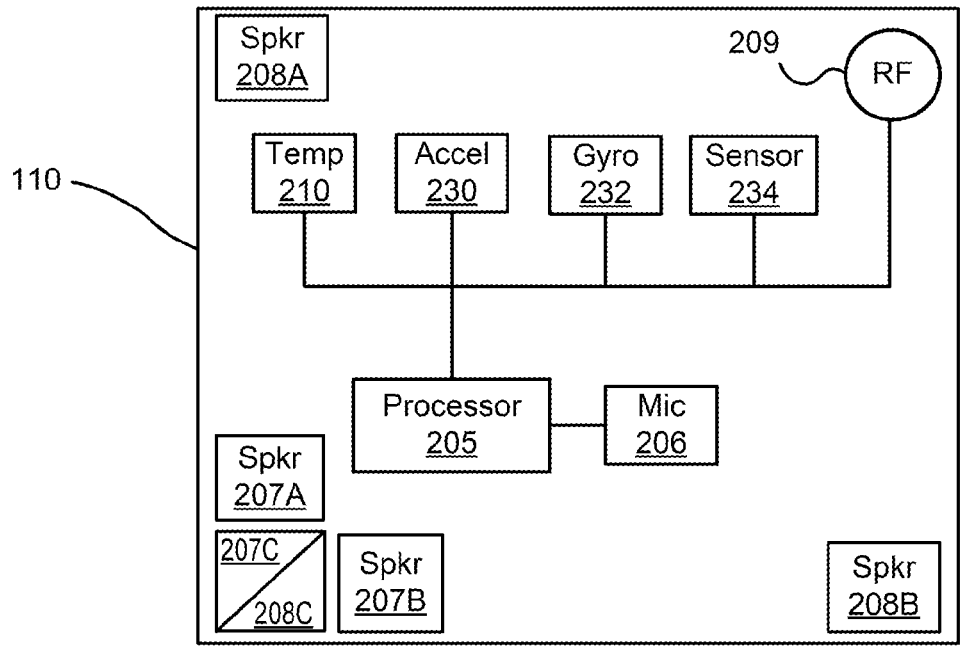
FIG. 2A is a block diagram of an exemplary embodiment of a positioning node, in accordance with aspects of the technology.

FIG. 2A is a block diagram of an exemplary embodiment of a positioning node 110, in accordance with aspects of the technology. The positioning node 110 illustrated in FIG. 2A includes positioning components including a processor 205, fine location speakers 207, coarse location speakers 208, a RF transceiver 209, an audio receiver 206 (or microphone 206), temperature sensor 210, an accelerometer 230, gyro 232, and a object sensor 234. Additional components that may be disposed on a positioning node 110 include keypads, displays, cameras, video cameras, illumination sources, bar code readers, RFID sensors, RFID tags, robotic arms, and/or the like. More or fewer components may be included in the positioning node 110. In various embodiments, the object sensor 234 includes cameras, video cameras, illumination sources, bar code readers, RFID sensors, RFID tags, robotic arms, magnetic sensors, capacitance sensors, infrared sensors, UV sensors, atmospheric pressure sensors, and/or the like.

The processor 205 is configured to manage communications, calculate a position of the positioning node 110 and provide for various other positioning functions. The microphone 206 may be used to receive acoustic waves, for example, from other positioning nodes 110, proximity nodes 140, and/or mobile devices 130. In some embodiments, the microphone 206 is used in the acoustic interference rejection algorithms, as described elsewhere herein. In some embodiments, the microphone is used to pick up audio from humans to detect traffic levels in different parts of an indoor environments.

The positioning node 110 of FIG. 2A includes two sets of speakers, namely fine location speakers 207 and coarse location speakers 208. The first set of speakers may be placed in close physical proximity to each other, these are called the fine location speakers 207. Typically separation for fine location speakers 207 is less than about one half wavelength of the carrier frequency to be emitted from the fine location speakers 207. In various embodiments, separations for the fine location speakers 207 in terms of the carrier wavelength emitted by the speakers 207 is about $1/10$, $1/10$, $1/8$, $1/4$, $1/3$, $1/2$, $2/3$, $3/4$, 1, 2, 4, 6, 8, 12, 16, 32, or more wavelengths. In some embodiments, the pair of fine location speakers 207A and 207C form a fine location speaker pair in a first axis; the pair of fine location speakers 207B and 207C form a fine location speaker pair in a second axis; and the pair of fine location speakers 207A and 207 B may form another fine location speaker pair.

Three fine location speakers 207A, 207B, and 207C may be used to determine a unique position of a microphone configured to receive audio ranging signals emitted from the fine location speakers 207, when the microphone is positioned within a plane defined by the three fine location speakers 207. Two potential positions for the microphone may be determined in three space using the three fine location speakers 207A, 207B, and 207C when the microphone is above or below the plane of the thee speakers 207A, 207B, and 207C. A fourth fine location speaker (not illustrated) outside a plane defined by the three speakers 207A, 207B, and 207C may be used to determine a unique location of the microphone in three space.

The second set of speakers may be placed physically farther away from each other. These are called the coarse location speakers 208. For example, the pair of coarse location speakers 208A and 208C form a coarse location speaker pair in a first axis. Similarly, the pair of coarse location speakers 208B and 208C form a coarse location speaker pair in a second axis. Likewise, the pair of coarse location speakers 208A and 208 B may form another coarse location speaker pair. Three coarse location speakers 208A, 208B, and 208C may be used to determine a unique position of a microphone configured to receive audio ranging signals emitted from the coarse location speakers 208, when the microphone is positioned within a plane defined by the three coarse location speakers 208. In some embodiments, a single speaker may serve as both fine location speaker 207C and coarse location speaker 208C. It is noteworthy that the positioning node 110 may be configured to include fine location speakers 207 without coarse location speakers 208, or coarse location speakers 208 without fine location speakers 207.

The RF transceiver 209 includes a RF transmitter and/or RF receiver, and may couple communications to the processor 205 and the other devices. In various embodiments, the RF transceiver 109 may couple communications between positioning node 110 and the network 106, the gateway node 120, the proximity nodes 140, and the mobile devices 130. The RF transceiver 209 may use a separate RF transmitter and RF receiver. In some embodiments only one of a RF transmitter 209 or RF receiver 209 is disposed on the positioning node 110. In various embodiments wireless communications includes Wi-Fi, Bluetooth, Zigbee, and/or the like. In various embodiments, RF refers to electromagnetic radiation including radio frequencies, infrared, visible light, ultraviolet, microwave, and/or the like.

The temperature sensor 210 is configured to measure the temperature of the environment and/or the positioning node 110. The temperature may be transmitted to mobile devices via the RF transmitter 209. The temperature may be used by the mobile devices 130 during the position calculation to estimate a speed of acoustic waves based on the temperature.

Figure 2B:
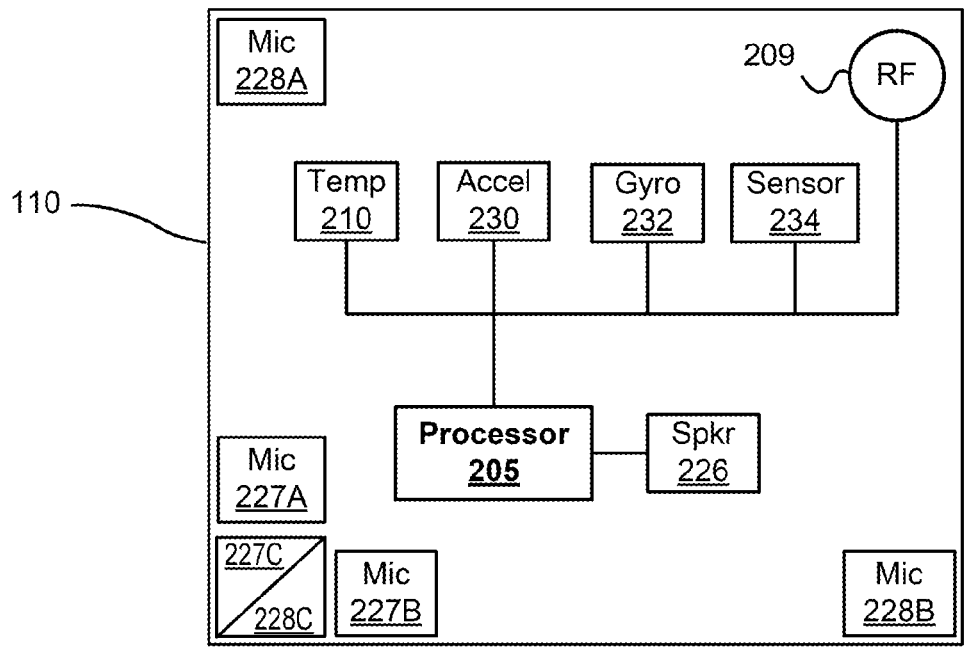
FIG. 2B is a block diagram of an alternative embodiment of positioning node, in accordance with aspects of the technology.

In some embodiments the role and disposition of microphones and speakers may be reversed. FIG. 2B is a block diagram of an alternative embodiment of positioning node 110, in accordance with aspects of the technology. The positioning node 110 illustrated in FIG. 2B includes a processor 205, fine location microphones 227, coarse location microphones 228, an RF transceiver 209, an audio transmitter 226, and a temperature sensor 210. FIG. 2B differs from FIG. 2A in that fine location microphones 227 and coarse location microphones 228 are used in FIG. 2B instead of fine location speakers 207 and coarse location speakers 207, respectively, used in FIG. 2A. Similarly, a speaker 226 is used in FIG. 2B instead of the microphone 206 of FIG. 2A. Additional components that may be disposed on a positioning 110 include cameras, video cameras, illumination sources, bar code readers, RFID sensors, RFID tags robotic arms, and/or the like. More or fewer components may be included in the positioning node 200.

The speaker 226 may be used to transmit acoustic waves, for example, to other positioning nodes 110, proximity nodes 140, and/or mobile devices 130. In some embodiments, the microphones 227 and 228 are used in the acoustic interference rejection algorithms, as described elsewhere herein. The positioning node 110 of FIG. 2B includes two sets of microphones, namely fine location microphones 227 and coarse location microphones 228.

The first set of microphones may be placed in close physical proximity to each other, these are called the fine location microphones 227. For example, the pair of fine location microphones 227A and 227C form a fine location microphone pair in a first axis. Similarly, the pair of fine location microphones 227B and 227C form a fine location microphone pair in a second axis. Likewise, the pair of fine location microphones 227A and 227 B may form another fine location microphone pair. Three fine location microphones 227A, 227B, and 227C may be used to determine a unique position of a speaker configured to transmit audio ranging signals to the fine location microphones 227, when the speaker is positioned within a plane defined by the three fine location microphones 227. Spacing for fine location for fine location speakers 207 as discussed elsewhere herein may be about the same for fine the location microphones 227.

The second set of microphones are placed physically farther away from each other, these are called the coarse location microphones 228. For example, the pair of coarse location microphones 228A and 228C form a coarse location microphone pair in a first axis. Similarly, the pair of coarse location microphones 228B and 228C form a coarse location microphone pair in a second axis. Likewise, the pair of coarse location microphones 228A and 228 B may form another coarse location microphone pair. In some embodiments, a single microphone may serve as both fine location microphone 227C and coarse location microphone 228C.

Three coarse location microphones 228A, 228B, and 228C may be used to determine a unique position of speaker configured to transmit audio ranging signals to the coarse location microphones 228, when the speaker is positioned within a plane defined by the three coarse location microphones 228. Two potential positions for the speaker may be determined in three space using the three fine location microphone 227A, 227B, and 227C when the speaker is above or below the plane of the thee microphone 227A, 227B, and 227C. A fourth fine location microphone (not illustrated) outside a plane defined by the three microphone 227A, 227B, and 227C may be used to determine a unique location of the speaker in three space. It is noteworthy that the positioning node 110 of FIG. 2B may be configured to include fine location microphones 227 without coarse location microphones 228, or coarse location microphones 228 without fine location microphones 227.

In some embodiments, microphones are more compact than speakers and may be positioned in closer proximity to each other. It is noteworthy that the configuration illustrated in FIG. 2B, may provide advantages over the configuration of FIG. 2A, such as a the ability to assemble a more compact package or the ability to use shorter wavelengths for ranging signals.

In some embodiments, a separation of less than about one half wavelength between fine location microphones 227 substantially reduces or eliminates aliasing. Thus, coarse location microphones 228 may be omitted from the positioning from the devices illustrated in FIG. 2B. Similarly, in some embodiments, a separation of less than about one half wavelength between fine location speakers 207 substantially reduces or eliminates aliasing. Thus, coarse location speakers 208 may be omitted from the positioning devices illustrated in FIG. 2A.

In various embodiments a separation between pairs of coarse location speakers 208 includes about 1, 2, 3, 4, 5, 10, 40 wavelengths, or longer. In various embodiments a separation between pairs of coarse location microphones 228 includes about 1, 2, 3, 4, 5, 10, 40 wavelengths, or longer. In various embodiments a separation between pairs of fine location speakers 207 includes 4, 3, 2, 2, ¼, ½, ⅛, 1/10 wavelengths, or shorter. In various embodiments a separation between pairs of fine location microphones 227 includes 4, 3, 2, 2, ¼, ½, ⅛, 1/10 wavelengths, or shorter.

While FIGS. 2A and 2B illustrate component configurations for positioning nodes 110, various combinations of one or more of the components disposed on the positioning node 110 illustrated in FIG. 2A or 2B may be disposed on gateway nodes 120, mobile devices 130, and/or proximity nodes 140. Typical configurations for positioning components disposed on mobile devices 130, proximity nodes 140, positioning nodes 110, and/or gateway nodes 120 include:

processor 205, microphone 206;
processor 205, speaker 207;
processor 205, microphone 206, speaker 207;
processor 205, RF transceiver 209, microphone 206;
processor 205, RF transceiver 209, speaker 207;
processor 205, RF transceiver 209, microphone 206, speaker 207;
processor 205, RF transceiver 209, microphone 206, location speaker pair 207 or 208;
processor 205, RF transceiver 209, location microphone pair 227 or 228, location speaker pair 207 or 208;
processor 205, RF transceiver 209, microphone 206, fine location speaker pair 207, coarse location speaker 208;
processor 205, speaker 226;
processor 205, microphone 227;
processor 205, speaker 226, microphone 227;
processor 205, RF transceiver 209, speaker 226;
processor 205, RF transceiver 209, microphone 227;
processor 205, RF transceiver 209, speaker 226, microphone 227;
processor 205, RF transceiver 209, speaker 226, location microphone pair 227 or 228;
processor 205, RF transceiver 209, speaker 226, fine location microphone pair 227, coarse location microphone pair 228;
processor 205, RF transceiver 209, . . . ;

The above configurations are intended to be illustrative rather than limiting. Any combination of the positioning components including processor 205, microphone 206, speaker 207, speaker 208, RF transceiver (transmitter and/or receiver) 209, temp sensor 210, speaker 226, microphone 227, microphone 228, accelerometer 230, gyro 232, and/or a object sensor 234 may be disposed on any combination of the positioning nodes 110, gateway nodes 120, mobile devices 130, and/or proximity nodes 140.

Figure 3:
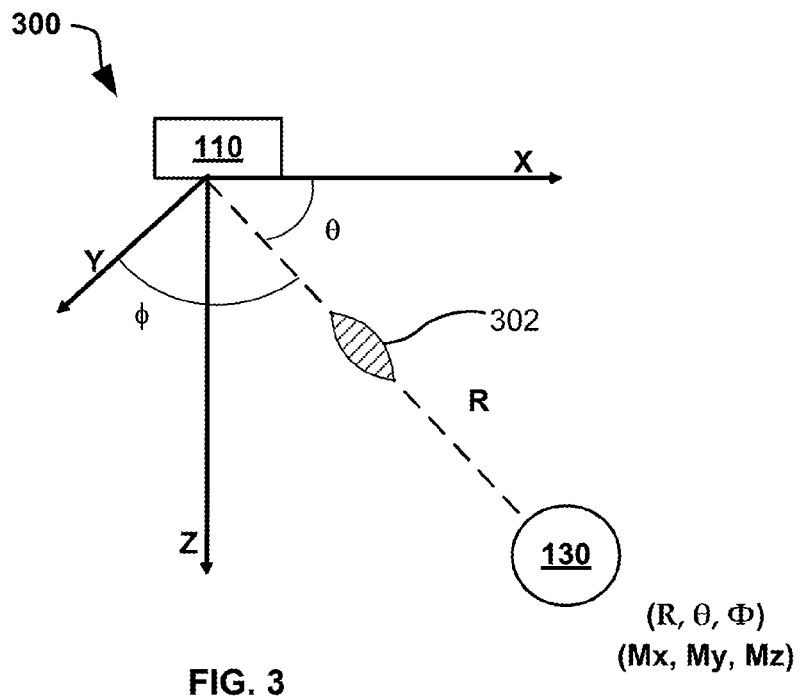
FIG. 3 is a diagram illustrating a frame of reference for a positioning node, and a mobile device.

FIG. 3 is a diagram illustrating a frame of reference 300 for a positioning node 110, and a mobile device 130. The mobile device 130 illustrated in FIG. 3 may be representative of a proximity node 140, a gateway node 120 and/or another positioning node 110. The frame of reference 300 includes orthogonal axes X, Y, and Z. The Y axis may be considered to be extending above and normal to the plane of the page. In some embodiments, the Y axis may be considered to be parallel to the direction of gravity. An azimuth θ may be an angle from the X-axis about the Y axis, in the plane defined by the X-Z axes. An elevation Φ an angle with reference to the Y-axis, above the plane of the X-Z axes. For simplicity FIG. 3 illustrates as an example a positioning node 110 disposed at the origin of the XYZ axes and a mobile device 130 at some position from the origin, However, the positioning node 110 and/or the mobile device 130 are representative of, and may be replaced in FIG. 3 and the descriptions of FIG. 3 by, a positioning node 110, a gateway 120, a mobile device 130, or a proximity node 140.

The positioning node 110 may transmit multiple acoustic ranging signals 302. For simplicity only one acoustic ranging signal 302 is illustrated as wave envelope in FIG. 3. A dotted line illustrates a path traveled by an acoustic ranging signal 302 between the positioning node 110 and the mobile device 130. In some embodiments, the acoustic ranging signals 302 are pure sinusoidal signals. The pure sinusoidal signals may be differentiated by frequency and/or amplitude. Alternatively, the acoustic ranging signals 302 are modulated signals. In various embodiments, the modulated acoustic ranging signals 302 are modulated by a pseudo-random sequence, a chirp sequence, square waves, triangular waves, saw-tooth waves, and/or the like. In general, any signal whose cross-correlation value includes a maximum at about 0 offset and presents a small cross-correlation values for non-zero offsets may be used for acoustical ranging. A cross-correlation value may be understood as an integrated value of the signal multiplied by time shifts of itself.

Acoustic ranging signals 302 may be transmitted from the positioning node 110 using fine location speakers 207 and coarse location speakers 208 simultaneously. Alternatively, the location speakers 207 and 208 transmit respective acoustic ranging signals 302 at different times. Modulation for the acoustic ranging signals 302 may be selected such that the modulation of the signals results in a low cross-correlation value among the differently modulated ranging signals, as well as an autocorrelation that is close to 0 at time shifts greater than about 0. A low cross-correlation allows multiple speakers 207 and/or 208 to transmit simultaneously and allows for a substantial reduction in interference from other ranging signals while the mobile device 130 to decode each acoustic ranging signal 302.

In some embodiments, the mobile device 130 transmits the acoustic ranging signal 302 using a speaker 226, and the positioning node 110 (as illustrated in FIG. 2B) may determine a position of the mobile device 130 using fine location microphones 227 and/or coarse location microphones 228.

Before the acoustic signals are transmitted from the positioning node 110, the positioning node 110 may transmit various protocol RF information to the mobile device 130 via a radio link mediated using the RF transceiver 209. In various embodiments, the protocol RF information includes an identification of the positioning node 110, an identification of the mobile device 130, a description of acoustic ranging signals being used by the positioning node 110, identification of pairs of fine location speakers 207, identification of pairs of coarse location microphones 208, identification of pairs of fine location microphones 227, identification of pairs coarse location microphones 228, temperature, accelerometer 230 data, gyro 232 data, object sensor 234 data, and/or the like. In some embodiments, the protocol RF information is transmitted via the RF transceiver 104 using information received from the server 102, gateway 120, and/or positioning node 110.

In some embodiments the protocol RF information includes information about a sequence and a carrier frequency and amplitude of a pseudo random sequence. For a chirp signal, the chirp sequence may include a starting frequency of the carrier, an ending frequency of the carrier, an initiation time, a time duration of the chirp signal, and/or the like. A temperature measured using the temperature sensor 210 may be transmitted via RF to the mobile device 130. The mobile device 130 may use the temperature to estimate a speed of the acoustic signal. In some embodiments, the speed of the acoustic wave is be computed at the positioning node and transmitted to the mobile device.

The mobile device 130 may calculate a range 'R' to the positioning node 110 by measuring elapsed time between receipt of the radio message transmitted by the positioning node 110, and arrival of acoustic ranging signals. Each measured elapsed time may be used to calculate a time of flight between the positioning node 110 the mobile device 130. The calculated times of flight of a plurality of ranging signals may be averaged to estimate range R. In some embodiments, the mobile device 130 transmits arrival times and/or elapsed times via RF to the positioning node 110, and/or the server 102 via the RF transceiver 104.

Additional precision in the calculated range R may be obtained by using speaker geometry in calculating a distance from the center of the positioning node 110 to the mobile device 130. In spherical coordinates, an azimuth θ and/or an elevation Φ angle may be computed using the fine location speakers 207. The fine location speakers 207 may be spaced about a half wavelength of the acoustic carrier frequency or less. The mobile device may measure a phase difference between fine location ranging signal carriers of two different fine location speakers 207. These angles may be used along with the range R to compute a three-dimensional position of the mobile device 130. The spherical coordinates (R, θ, Φ) may be transformed into plane coordinates (Xm, Ym, Zm).

Figure 4:
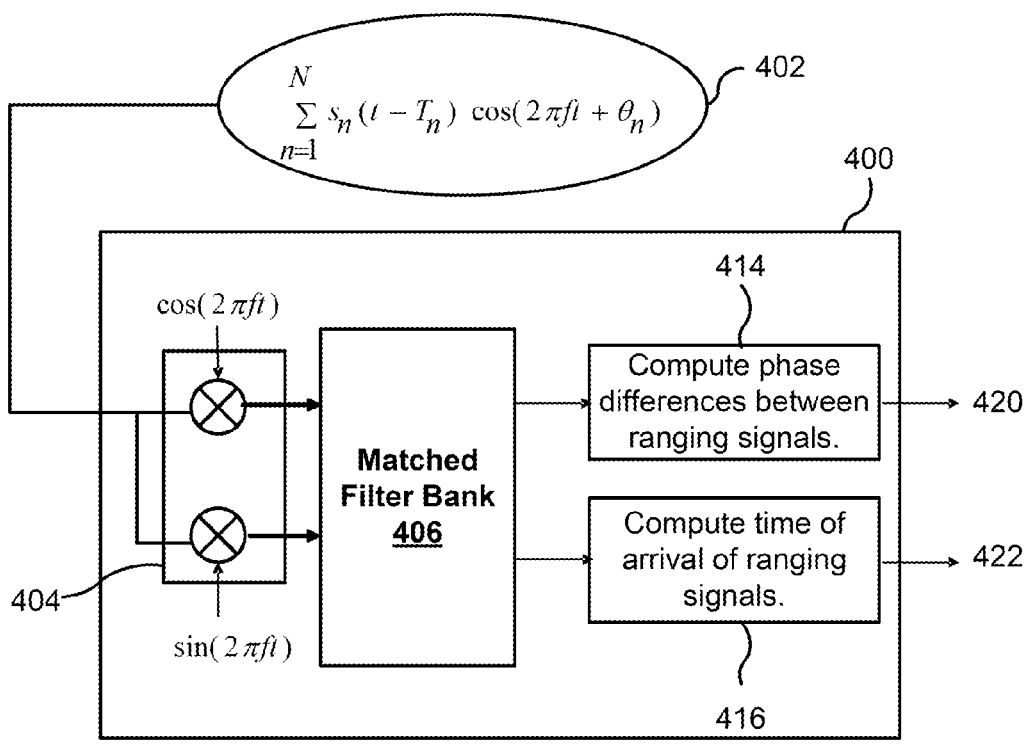
FIG. 4 is a block diagram illustrating a signal processor for determining phase differences and arrival times of acoustic ranging signals.

FIG. 4 is a block diagram illustrating a signal processor 400 for determining phase differences and arrival times of acoustic ranging signals. Multiple acoustic ranging signals 302 emitted from a plurality of speakers 207, 208, and/or 226 may be detected at the microphone 206 and applied to the signal processing module 400 as input signal 402. Alternatively, the input signal 402 may be a sum of a plurality of acoustic ranging signals 302 emitted by a single speaker (e.g., speaker 226) and detected at a plurality of separated microphones 227, 228, and/or 206 disposed on one or more devices 110. The plurality of acoustic ranging signals 302 may be communicated to the signal processing module 400 directly via onboard hardwire on device 110, and/or via RF communications.

The input signal 402 may be described as a sum of a plurality of modulated carrier signals, each modulated carrier signal having a phase offset that depends on the relative positions of the positioning nodes. The input signal 402 of FIG. 4 illustrates a modulated carrier wave (i.e., a carrier frequency that is modulated by a ranging signal) that may be characterized by the Equation 1:

$$\sum_{n=1}^{N} s_n(t - T_n)\cos(2\pi f_n t + \theta_n) \quad 1)$$

where N represents the total number of acoustic transmitters, acoustic receivers, and/or ranging signals received;

n is the $n_{th}$ acoustic ranging signal;

$T_n$ represents the propagation delay in the nth ranging signal;

$\cos(2\pi f_n t + \theta_n)$ represents the unmodulated carrier signal that is part of the nth acoustic ranging signal;

$f_n$ represents the frequency of the nth unmodulated carrier signal;

$\theta_n$ represents the phase shift of the nth acoustic ranging signal; and $s_n$ represents the nth unmodulated acoustic ranging signal.

In some embodiments, the ranging signal can be a pseudo random signal. A carrier frequency of the ranging signals may be estimated. The acoustic ranging signals may be down-converted to baseband using the quadrature mixer 404. In some embodiments, the quadrature mixer 404 is configured to multiply the input signal 402 by the terms $\cos(2\pi f_n t)$ and/or $\sin(2\pi f_n t)$. The effect of this mixing operation is to remove the high frequency carrier terms from the input signals. The output of the quadrature mixer 404 will contain the desired acoustic ranging signals as well as the ranging signals modulated by twice the carrier frequency. The high frequency terms may be filtered out by the matched filter bank 406.

The baseband signal may be passed through a bank of quadrature matched filters in the filter bank 406. In filter bank 406, each matched filter may be matched to each of the ranging signals 302 transmitted by speakers 207, 208, and/or 226, and/or received by microphones 227, 228, and/or 206. Filters may be selected based on received protocol RF information. The matched filter output signal may have a large amplitude indicating arrival of an acoustic ranging signal. A threshold may be used to differentiate between noise and a valid acoustic ranging signal.

Once the acoustic ranging signals are detected using the matched filter bank 406, a correlation processor or phase module 414 may generate a calculated phase difference 420 between the carrier waves of the multiple acoustic ranging signals 302. A range module 416 may generate a calculated time of flight 422 of the multiple acoustic ranging signals. The signal processor 400 may be disposed in the processor 205 as a hardware component and/or a software module.

Figure 5A:
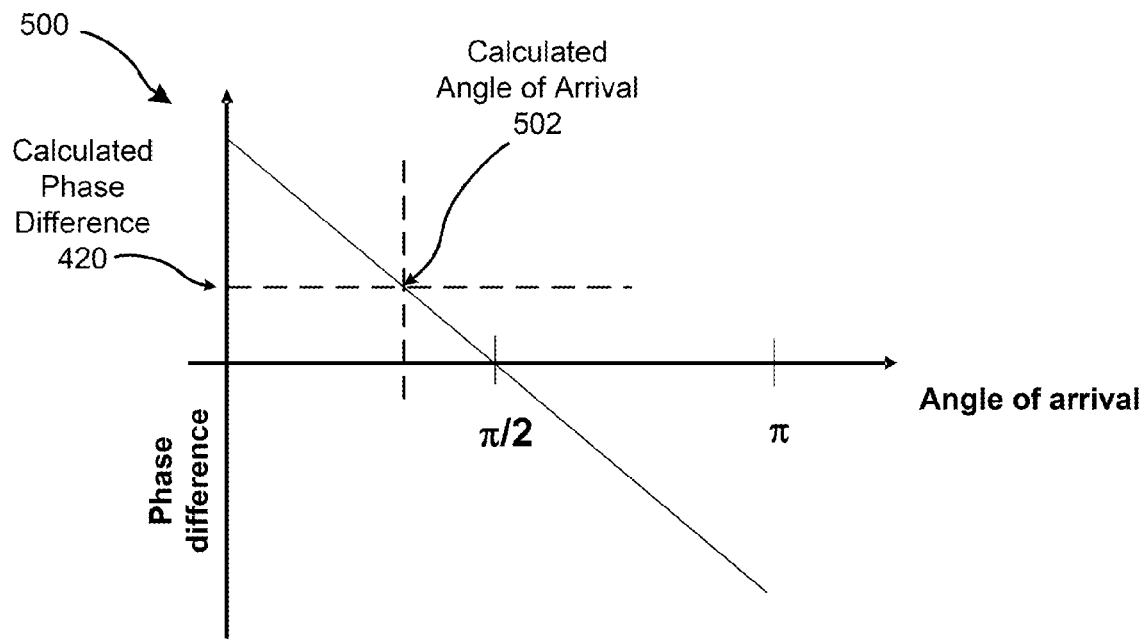
FIG. 5A is a graph illustrating calculated angle of arrival and phase difference for acoustical ranging speakers spaced less than a half wavelength apart.

FIG. 5A is a graph 500 illustrating calculated angle of arrival and phase difference for acoustical ranging speakers spaced less than a half wavelength apart. The vertical axis represents phase difference between signals from a pair of fine location speakers 207. The fine location speakers 207 may be mounted along an axis of the positioning node 110, e.g., the X or Y axis of FIG. 3.

The horizontal axis represents angle of arrival that may be calculated based on the phase difference. The angle of arrival represents an azimuth θ or an elevation Φ, with respect to the X or Y axis, respectively. FIG. 5A illustrates a condition where separation of the fine location speakers 207 is less than a half wavelength apart. A calculated phase difference 420 may be used to generate a calculated angle of arrival 502. It can be seen that there is a one to one relationship between angle of arrival and phase difference. Thus, the angle of arrival 502 can be calculated directly from calculated phase difference 420.

For human inaudible frequencies, which include frequencies greater than about 20 KHz, a half wavelength in air is smaller than about 8.5 mm. Thus, speakers approximately 8.5 mm in size or less can be placed at less than a half wavelength of spacing. A problem discovered in the course of developing the disclosed technology is that power output of speakers is a function of speaker size. That is, small speakers may be limited in power output, which may in turn limit the range at which an audio ranging signal from the speakers can be detected. Speakers that are larger than half a wave length of the of the carrier frequency have greater power. Unfortunately, spacing the larger speakers at more than a half wavelength apart results in multiple angles of arrival being calculated from the computed phase difference due to aliasing of the computed phase differences between ranging carrier signals. In such a case, a one to one relationship between phase difference and angle of arrival does not exist.

Figure 5B:
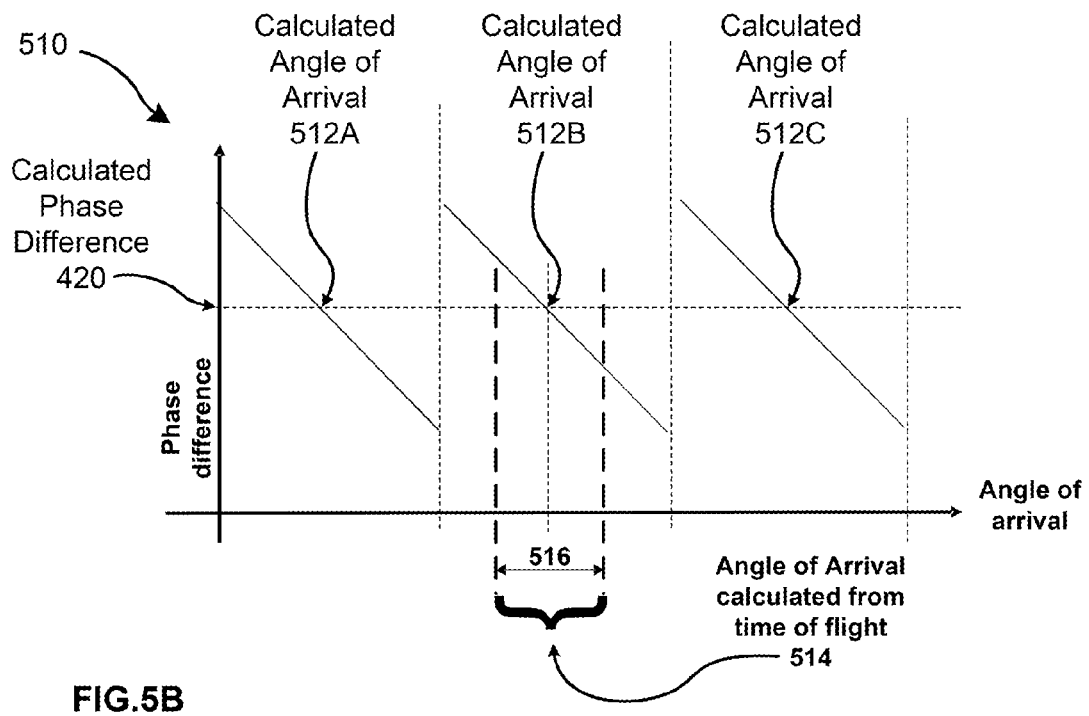
FIG. 5B is a graph 510 illustrating angle of arrival and phase difference for acoustical ranging speakers spaced more than a half wavelength apart.

FIG. 5B is a graph 510 illustrating angle of arrival and phase difference for acoustical ranging speakers spaced more than a half wavelength apart. FIG. 5B differs from FIG. 5A in that graph 510 illustrates a spacing of about three half wavelengths resulting in three calculated angles of arrival 512A, 512B, and 512C. All three calculated angles of arrival 512A, 512B, and 512C may be calculated from the calculated phase difference 420. Thus, a use of calculated angle of arrival 420 from aliased phase differences to estimate positions, results in ambiguity.

A solution is to resolve the ambiguity between calculated angles of arrival 512A, 512B, and 512C using acoustic ranging signals from the coarse location speakers 208 and/or fine location speakers 207. A calculated angle of arrival 514 may be generated from at least two calculated times of flight 422, which are generated for each of multiple coarse location speakers 208 or each of multiple fine location speakers 207. The calculated time of flight 422 from the coarse location speakers 208 and/or fine location speakers 207 may also be used to calculate a rough estimate of the angle of arrival 514. Unfortunately, a calculated angle of arrival 514 that is based on calculated time of flight 422 is substantially less accurate than a calculated angle of arrival 512 that is based on a calculated phase difference 420. However, the coarse position speaker spacing and/or fine location speaker spacing may be selected to provide an angle of arrival accuracy 516 that is better than the aliasing, as illustrated in FIG. 5B. Thus, the calculated angle of arrival 514 may be used to de-alias (or resolve) the calculated angle of arrival 512A-C from fine location speakers 207.

A coarse margin may be expressed in units of degrees. In some embodiments, an acceptable coarse margin in degrees is about +/−180/S degrees, where S is a number of half wavelengths spacing between the speakers. If the coarse location speakers 208 and/or fine location speakers 207 are used to provide for a calculated angle of arrival within the coarse margin 516, then the correct calculated angle of arrival 512B can be selected from the calculated angles of arrival 512A-C. It is noteworthy that spacing the fine location speakers 207 farther apart provides for an added advantage of increased angular resolution between the mobile device 130 and the positioning node 110. However, increasing spacing of the fine location speakers decreases acceptable coarse margin 516. A spacing of the fine speakers may be selected such that noise in the environment and circuit noise causes the error in angle of arrival estimated by the coarse speakers to be just less than the coarse margin. Such a spacing may be used to increase or maximize angular resolution while reducing aliasing.

The mobile device 130 may transmit its position to the positioning node 110 via RF. The positioning node 110 may forward the position of the mobile device 130 to the gateway 120, which in turn may send the position of the mobile device 130 to the server 102. In some embodiments, the mobile device 130 may send its position to the RF transceiver 104, which may in turn send the position of the mobile device 130 to the server, a positioning node 110, gateway 120, a proximity node 140, or another mobile device 130. If the mobile device 130 has a direct link to the internet, such as a cellular link or WiFi link, it may send its location directly to the server 102. The position of mobile device 130 may be queried from the server 102 by other devices in communication with the server 102 via the network 106. In some embodiments, a map is downloaded to the mobile device 130, and the computed position of the mobile device 130 may be displayed on the mobile device 130, e.g. when the mobile device 130 includes a display, e.g., smartphone, tablet, netbook, laptop, MFD, bar code reader, RFID reader, and/or the like.

In some the positioning node 110 of FIG. 2A may be used determining a position of a mobile device 130 that is a smart phone. The smart phone may receive the acoustic ranging signals transmitted by a positioning node and the onboard processor in the smart phone may calculate multiple aliased angles of arrival and de-alias the angles to select and angle of arrival between the smart phone and the positioning device as described elsewhere herein. The smart phone may also receive protocol RF information (including time of transmission of the acoustic ranging signals), and use the time of transmission and time arrival to calculate time of flight for determining a distance from the positioning node 110 and the smart phone, as described elsewhere herein.

As discussed elsewhere herein, the configuration of FIG. 2B may be used for the mobile device 130 and positioning node 110, instead of the configuration of FIG. 2A. Thus, a fine location microphone pair 227 and a coarse location microphone pair 228 on the mobile device, and a speaker 226 may be used on the positioning node 110. It is noteworthy that in some embodiments, microphone sensitivity does not have the same dependency on size as speaker power. Since, microphone sensitivity does not degrade substantially with decreased size, a decreased spacing of fine location microphones 227 may serve to the reduce the number of aliased calculated angles of arrival 412.

A problem recognized in the course of developing the disclosed technology with indoor positioning networks is the need to calibrate the position of components of the positioning infrastructure, including positioning nodes 110, gateways, proximity nodes 140, mobile devices 130, objects 132, barriers, walls, obstructions and/or the like. If the number of positioning nodes 110 is small and in a fixed position, it may not be too difficult to calibrate the infrastructure once. However, in many harsh RF environments, it is necessary to deploy a higher density of positioning nodes 110. Furthermore, the positioning nodes 110 may be placed on movable objects such as carts, shelves, pallets, tables, hand trucks, rounders, and/or the like. When these are moved around a new calibration may need to be performed. A solution is for the positioning infrastructure to perform a self-calibration of components of the infrastructure rendering manual calibration of the infrastructure position unnecessary.

FIG. 6 is a block diagram of an infrastructure 600 for performing self calibration, in accordance with aspects of the technology. Infrastructure 600 includes an anchor node 110A, positioning nodes 110B and 110C, proximity nodes 140A and 140B, and mobile devices 130A and 130B. More or fewer positioning nodes 110, proximity nodes 140, mobile devices 130, and/or anchor nodes 110A may be present in the infrastructure 600.

One or more anchor nodes 110A may be used for self calibration. An anchor node 110A is a positioning node 110 or proximity node 140 having a well known position. In some embodiments, the anchor node is a positioning node 110 that is relatively stationary, and not likely to move. A position of the anchor node 110A may be programmed using a server 102, a keypad, another positioning node 110, a proximity node 140, a handheld computer or a mobile device 130, such as a cell phone, pad, netbook, PDA, and/or the like. The anchor node 110A may transmit its position to nearby neighboring nodes, including positioning nodes 110B-C, proximity nodes 140, and/or mobile devices 130E using its radio link.

The anchor node 110A may also transmit acoustic ranging signals 302 to its neighbors and/or receive acoustic ranging signals 302 from its of its neighboring nodes (positioning nodes 110B-C, proximity nodes 140, and/or mobile devices 130B) as described in more detail elsewhere herein. The neighboring nodes may receive these acoustic ranging signals 302 using their built in microphone 206 or 226, and use these received acoustic ranging signals to estimate their position relative to the anchor node 110A. This process can be iterated multiple times between each anchor node 110A and positioning node 110E to improve the location accuracy. Once a position of positioning node 110 has been estimated, that positioning node 110 (having a known position) may used as an anchor node for other positioning nodes 110 and/or proximity nodes 140.

For example, the anchor node 110A may transmit protocol RF information and acoustic ranging signals to positioning node 110B, using fine location speakers 207 and coarse location speakers 208 disposed on the anchor node 110A. The protocol RF information may include the position of the anchor node 110A. The positioning node 110E may calculate its position based on the received protocol RF information and acoustic ranging signals as described elsewhere herein.

In some embodiments, the anchor node 110A may transmit data that is based on received acoustic ranging signals to the server 102 via the RF transceiver 104 or to the anchor node 110A via the RF transceiver 209. The position calculations of the positioning node 110E may be performed at the server 102 or the anchor node 110A.

Upon determination of the position of the positioning node 110B, the positioning node 110E may then function as an anchor node, and transmit protocol RF information. The positioning/anchor node 110E may further transmit acoustic ranging signals to positioning node 110C, using fine location speakers 207 and coarse location speakers 208 disposed on the anchor node 110B. The protocol RF information may include the position of the anchor node 110B. The positioning node 110C may calculate its position based on the protocol RF information and acoustic ranging signals received from the positioning/anchor node 110B, as described elsewhere herein.

The positioning/anchor node 110E may similarly transmit protocol RF information and acoustic ranging signals to the proximity node 140A, using fine location speakers 207 and coarse location speakers 208 disposed on the anchor node 110B. The position of proximity node(s) 140A may be determined as described elsewhere herein.

Positioning node 110C may similarly function as an anchor node and transmit RF and acoustic signals for determination of a position of mobile device 130E and/or proximity node 140B. Similarly, positioning node 110C may transmit RF and acoustic signals for determination of an alternative position of positioning node 110E and/or anchor node 110A. Anchor node 110A and/or positioning node 110E may use the determined alternative positions to refine the accuracy of position calculations for various components of the infrastructure 600.

In some embodiments, the anchor node 110A may send protocol RF information to the positioning node 110E that includes request for positioning node to transmit acoustic ranging signals. In response, positioning node 110E may transmit acoustic ranging signals to anchor node 110A, using a speaker 226 disposed on positioning node 110B. Anchor node 110A may receive the acoustic ranging signals using fine location microphones 227 and coarse location microphones 228 disposed on the anchor node 110A. Anchor node 110A may use the received acoustic ranging signals and its own known position to calculate a position of the positioning node 110B. An assumption may be made that the time for response to the request at the positioning node 110E is negligible compared to the time of flight of the acoustic ranging signals from the positioning node 110E to the anchor node 110A. Alternatively, the positioning node 110B may transmit protocol RF information to anchor node 110A that includes a time for initiation of transmission of the acoustic ranging signals.

The anchor node 110A may transmit protocol RF information to the positioning node 110E including a calculated position of positioning node 110B. The positioning node 110E may use the received position to function as an anchor node and request acoustic ranging signals from positioning node 110C, for determining a position of the positioning node 110C.

In some embodiments, the server 102 may transmit protocol RF information via the RF transceiver 104 to provide timing and control of the anchor node 110A. positioning nodes 110B-C, proximity nodes 140A-B, and/or mobile devices 130A-B. The anchor node 110A. positioning nodes 110B-C, proximity nodes 140A-B, and/or mobile devices 130A-B may transmit and receive acoustic ranging signals as described elsewhere herein under control and timing provided by the server 102. The server 102 may receive data from the anchor node 110A. positioning nodes 110B-C, proximity nodes 140A-B, and/or mobile devices 130A-B for calculating positions of the respective nodes and/or devices. Optionally, any of the positioning nodes 110 may transmit protocol RF information via its own RF transceiver 109 for providing timing and control, and receive data via the RF transceiver 109 for calculating positions of proximity nodes 140, mobile devices 130, and/or other positioning nodes 110.

Figure 7A:
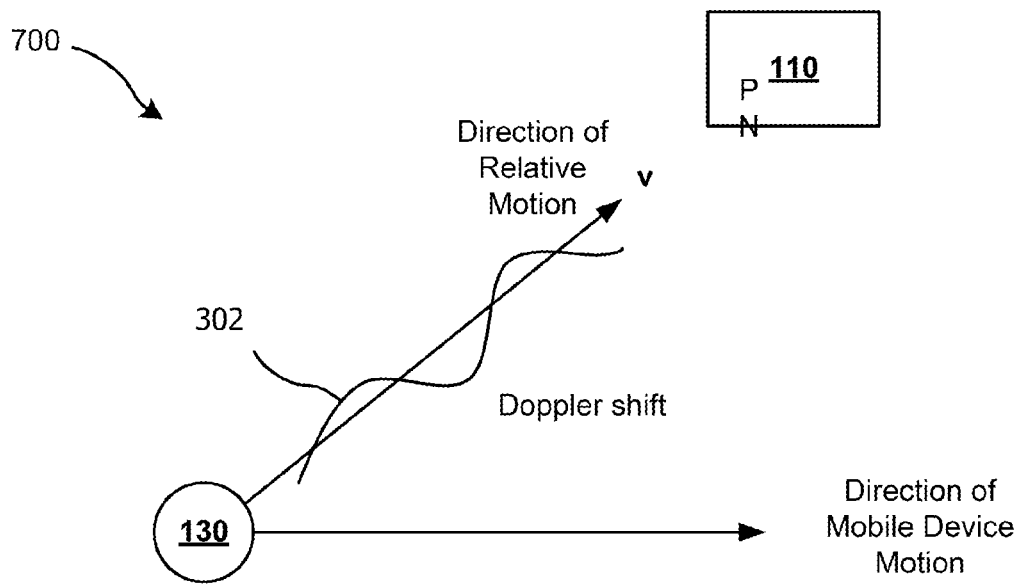
FIG. 7A is a diagram 700 illustrating Doppler shift of a mobile device 130 with respect to a positioning node 110.

FIG. 7A is a diagram 700 illustrating Doppler shift of a mobile device 130 with respect to a positioning node 110. A challenge appreciated while developing the disclosed technology is that using acoustic signals for positioning a moving device may result in an error in the calculated position. The calculated position indicates the position of the moving device when the acoustic signal was sent, since the time of flight remains unchanged by Doppler shift. However, the moving device is no longer in the same position when the acoustic signal is received as it was when the acoustic signal was sent. Further, the Doppler shift changes the carrier frequency of the received signal compared to the transmitted signal. Without correction for Doppler shift, the matched filter bank 406 of the signal processor 400 detects the signal is arriving at a shifted frequency that is different from the transmitted frequency. An output 420 from the correlation processor 414 will not indicate a strong match. A correction for Doppler shift increases a match between frequencies. Output 420 from the correlation processor 414 will be stronger, and the angle of arrival computation will be more accurate.

A Doppler shift may provide an indication of velocity of the moving device that can be used for correcting the calculated position as a function of time. Doppler shift can be very large even with relatively slow motion. The Doppler shift for a signal illustrated in the diagram 700 of FIG. 7A may be represented as: f*v/c, where f is the carrier frequency, v is the relative velocity of motion between the mobile device 130 and the positioning node 110, and c is the velocity of the wave in the medium, e.g., air. The Doppler shift of an acoustic wave can be much larger than a radio wave due to the relatively slow speed of sound in air. If the Doppler shift remained relatively constant during motion of the mobile device 130, then transmission of the acoustic signal the problem may be corrected with relatively simple transforms. At the receiver, the signal carrier would simply be a lower or higher frequency sinusoid. The change in frequency may be estimated and corrected for. The problem becomes more complex when the relative motion between the mobile device 130 and the positioning node 110 is non constant, creating a time-varying Doppler shift, e.g., during a change indirection or acceleration of the mobile device 130.

If an accelerometer 230 and/or a gyro 232 is disposed on mobile device 130, a time-varying Doppler shift can be estimated and corrected for. An accelerometer may be used to determine a coarse estimate of the changes in Doppler shift, assuming no significant rotation of the mobile device 130. The accelerometer 230 may include one, two, or three axes of information. In some embodiments, frequency information may be included in the protocol RF information. The frequency of the transmitted ranging signal may be compared with the frequency of the received signal and the difference may be used for estimating velocity.

Figure 7B:
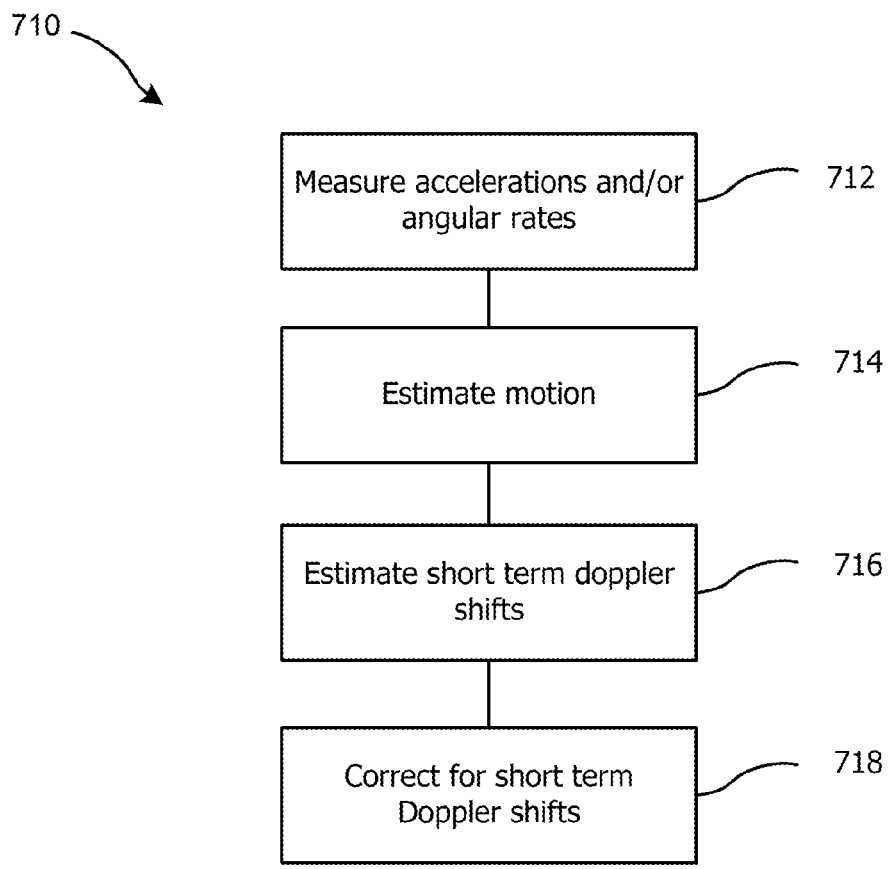
FIG. 7B illustrates a method 710 for correcting for short term Doppler shifts. In step 712, the a linear acceleration may be measured in one or more axes using an accelerometer 230 disposed on the mobile device 130.

FIG. 7B illustrates a method 710 for correcting for short term Doppler shifts. In step 712, the a linear acceleration may be measured in one or more axes using an accelerometer 230 disposed on the mobile device 130. Also, angular acceleration may be measured using inertial sensors, such as a gyro 232 disposed on the mobile device 130. In step 714, the measured linear acceleration and/or angular acceleration may be used for estimating motion of the mobile device 130 during a period of transmission of the acoustic ranging signal 302. In step 716, the estimated motion of the mobile device may be used for estimating short term Doppler shifts of the arriving acoustic ranging signals 302. In step 718, the mobile device may apply a correction based on the estimated short term Doppler shift to the incoming acoustic ranging signals 302.

Figure 8A:
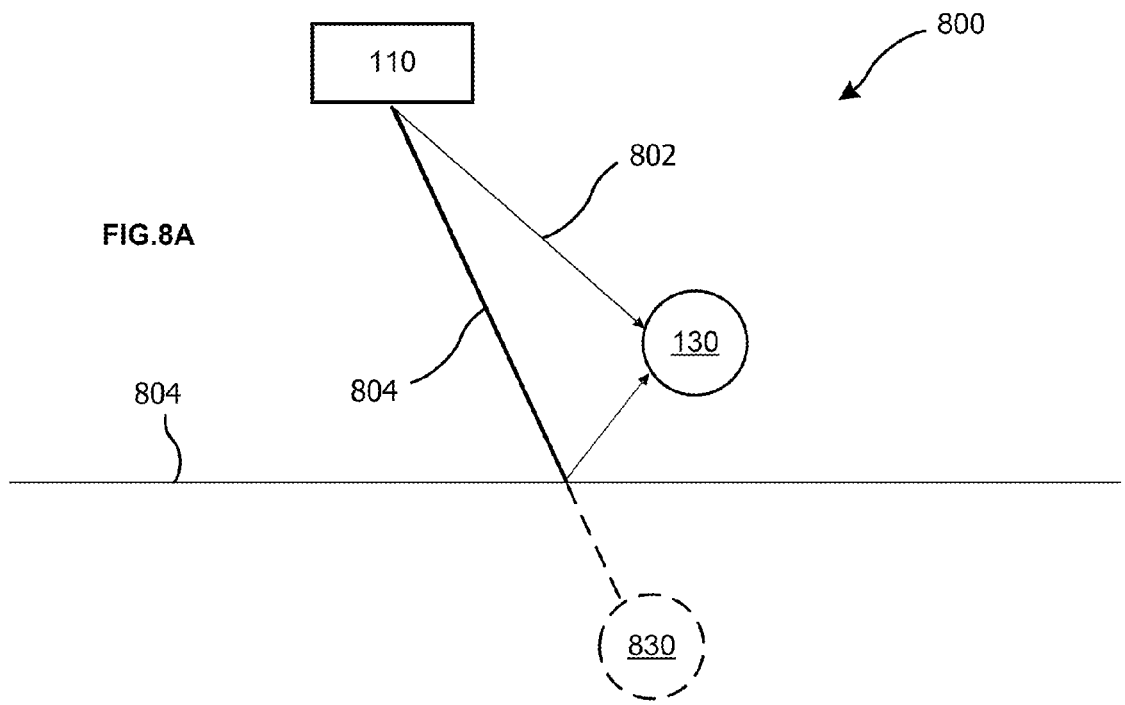
FIG. 8A is a diagram illustrating reflections of acoustic ranging signals.

FIG. 8A is a diagram illustrating reflections of acoustic ranging signals 302. In some embodiments, acoustic ranging signals 302 are reflected off of a surface 806 such as a wall, floor, ceiling, and/or the like. Such reflections of acoustic ranging signals 302 that are received by a microphone 206, 227, or 228 may be resolved. This is due to the relatively slow speed of acoustic waves in air. In a multipath environment, a matched filter output may exhibit several peaks. Each peak may correspond to a different path of the acoustic ranging signal 302. In FIG. 8A, there is a line of sight 802 path (LOS 802) and a reflection path 804 that includes a reflection off of the surface 806. If the LOS 802 path is able to be received by the mobile device 130, it is simply a matter of picking the first received signal, since the LOS path will arrive first at the mobile device 130. In some embodiments, the LOS 804 path is blocked and not be received at the mobile device 130. A method may be used to filter out reflection paths 804 so that the mobile device 130 does not use an acoustic signal 302 from reflection paths 804 to compute a false location. In the case where the reflection path 804 is off of the surface 806, as illustrated in FIG. 8A, an apparent position 830 of mobile device 130 due to the reflection will be computed as being beyond the surface 806. This may be filtered out by noting that the position 830 is outside the allowed locations for mobile device 130.

Figure 8B:
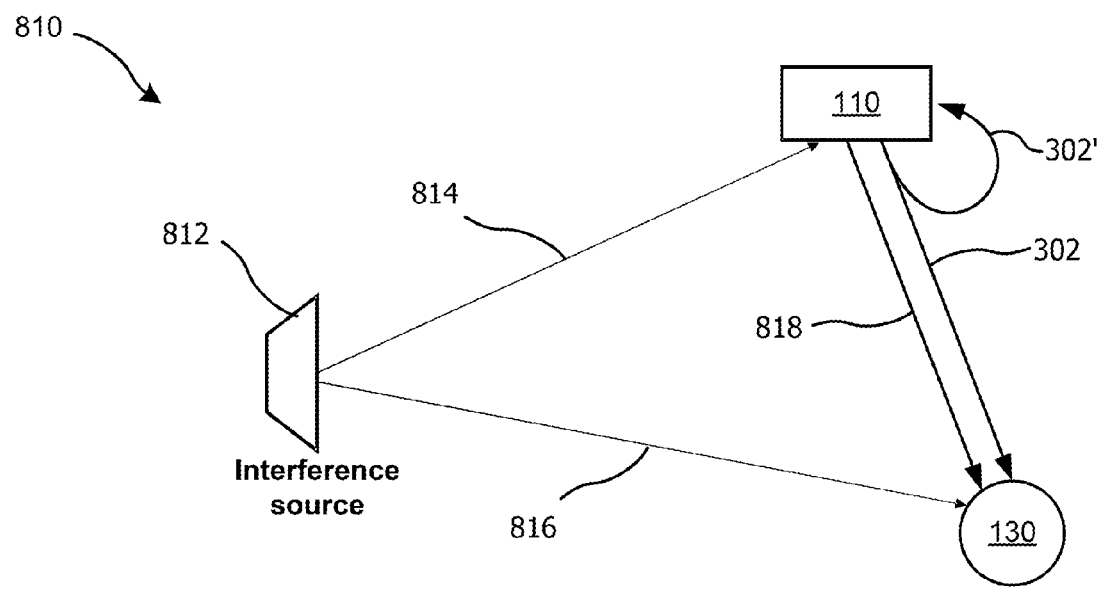
FIG. 8B is a diagram illustrating acoustic interference caused by an acoustic source.

FIG. 8B is a diagram 810 illustrating acoustic interference caused by an acoustic source 812. Acoustic interference from the source 812 may be in a frequency band of an acoustic ranging signal 302 and may reduce the operating range of a positioning node 110. The acoustic interference source 812 of FIG. 8B generates an acoustic interference signal 814 that is received by the positioning node 110 and an acoustic interference signal 816 that is received by the mobile device 130. In many cases, the acoustic interference signal 814 received at the positioning node 110 may be correlated with the acoustic interference 816 that is received at the mobile device 130. This may occur when the mobile device 130 is in close proximity to the positioning node. A method may be developed to mitigate the interference.

Figure 9:
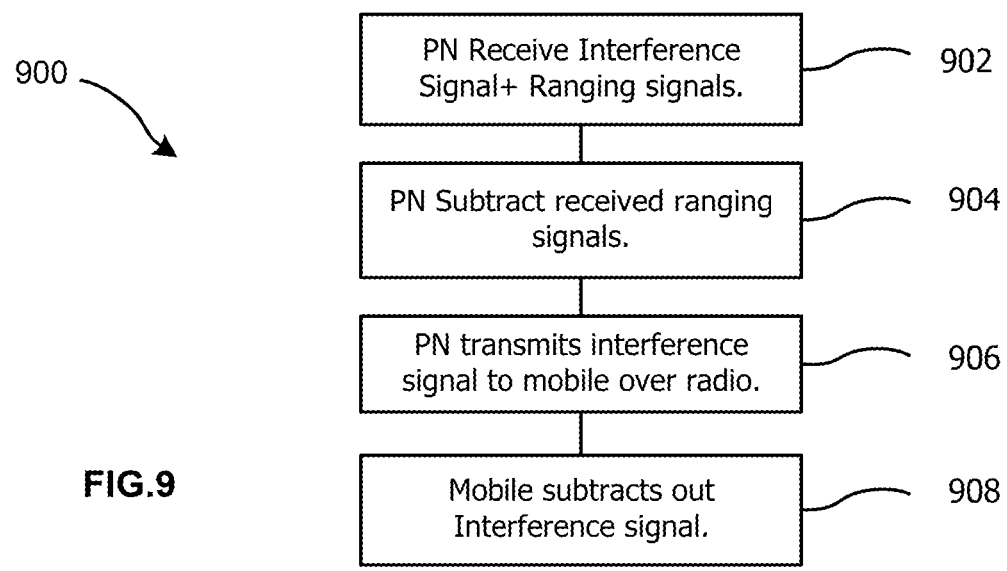
FIG. 9 illustrates a method for reducing acoustic interference.

FIG. 9 illustrates a method 900 for reducing acoustic interference. In step 902, positioning node 110 receives the acoustic interference signal 814 while at the same time transmitting the acoustic ranging signal 302. The microphone 206 on the positioning node 110, thus, receives the acoustic interference signal 814 in addition to acoustic ranging signals 302' emitted from the location speakers 207 and/or 208. At step 904, the positioning node 110 may subtract the acoustic ranging signal 302' from the acoustic interference signal 814 to obtain an estimate of the interference signal 814. At step 906, the positioning node may transmit an estimated interference signal 818 via the RF transceiver 209 disposed on the positioning node 110, to the mobile device 130. At step 908, the mobile device 130 receives the estimated interference signal 818 using the RF transceiver 209 disposed on the mobile device 130. The mobile device 130 may subtract the estimated interference signal 818 from the received acoustic ranging signal 302. The mobile device 130 may apply a variety of time shifts and/or amplitudes to the estimated interference signal 818 to correct for a difference in time of arrival and/or amplitude of the acoustic interference signal 816 at the mobile device 130 as compared with the time of arrival and amplitude of the acoustic interference signal 814 at the positioning node 110.

A mobile device may receive acoustic ranging signals from nearby positioning nodes as well as radio signals from nearby proximity sensors. Positions based on acoustic position measurements may be more accurate than positions based on the radio based position measurements. Alternatively, positions based on radio position measurements are more accurate than positions based on the acoustic based position measurements. In some embodiments, an acoustic ranging signal is received without a radio signal. Alternatively, a radio signal is received without an acoustic ranging signal. A Kalman filter may be used to integrate measurements based on radio signals and measurements based on acoustic signals from one or more positioning nodes. In some embodiments, the Kalman filter may also integrate measurements based on inertial sensor outputs (e.g., accelerometer 230, gyro 232, and/or the like).

For many indoor applications, it is useful to have a map of the indoor environment. This may be useful for displaying a position of a mobile device 130 in reference to a map of the environment for helping a human navigate. It may also be useful for other purposes such as robotic navigation. Unfortunately, the mapping process may be time consuming and tedious. If a map does exist, it may not contain the actual dimensions of each indoor structure. If a map does not exist, many measurements may be required to create a detailed map. Further, many indoor environments have indoor structures that are constantly being repositioned such as shelves and other movable structures. It would therefore be beneficial if the proposed positioning network could also automatically create a map of the environment.

Figure 10:
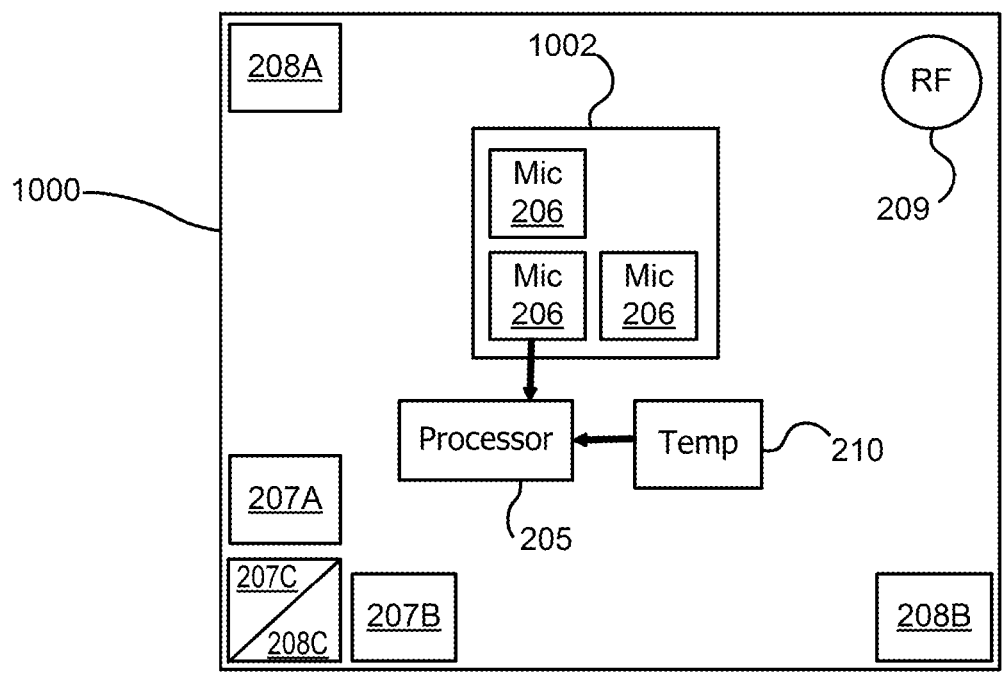
FIG. 10 illustrates an alternative embodiment of a positioning node that integrates three microphones.

FIG. 10 illustrates an alternative embodiment of a positioning node 1000 that integrates three microphones 206. While the accelerometer 230 and gyro 232 are omitted from FIG. 10 for clarity, the inclusion of these components in positioning node 1000 is also contemplated. Although three microphones 206 are illustrated in FIG. 10, more or fewer microphones 206 may be used for improved performance. The microphones may be used to estimate the angle of arrival of reflected acoustic waves from walls and other structures.

Figure 11:
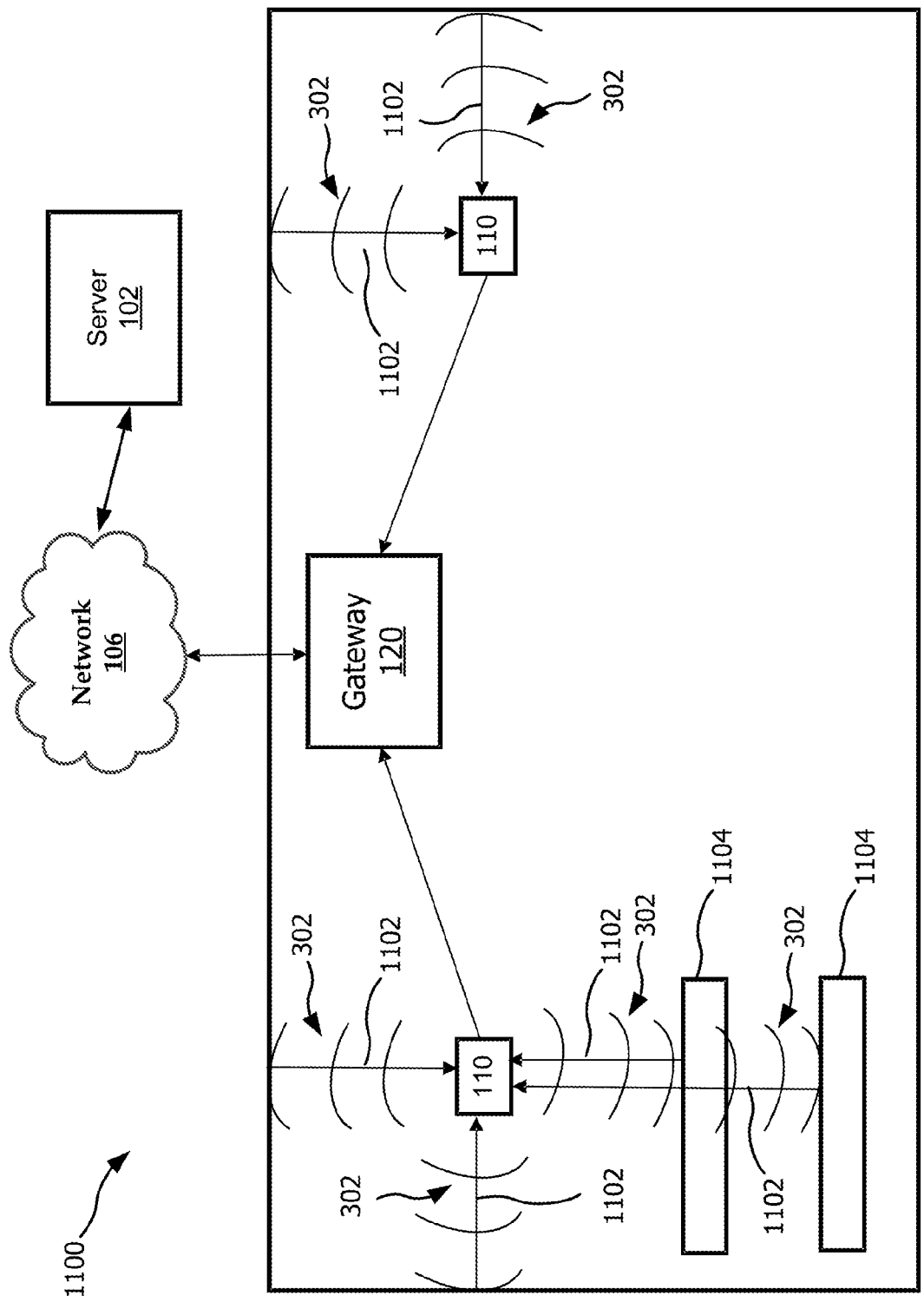
FIG. 11 is a block diagram illustrating a mapping environment.

FIG. 11 is a block diagram illustrating a mapping environment 1100. Beam-forming algorithms may be used to enhance the received acoustic signal strength. In FIG. 11, each of the positioning nodes 1000 illustrated in FIG. 10 transmits an acoustic ranging signal 302. Reflected waves may be returned from obstacles 1104, walls, floors, doors, ceilings, and/or the like. The positioning nodes 1000 then listen for the reflected waves 1102. Using the microphone array 1002, an angle of arrival of the reflected waves 1102 may be estimated for each reflection. Multiple reflected waves 1102 may be resolved using the matched filter processing capabilities of the signal processor 400, as described elsewhere herein. For each reflected wave 1102, a round trip time may be computed. The round trip time of the reflected waves 1102 may be used to provide an angle of arrival and range to obstacles 1104 in the room. In some embodiments, the reflected acoustic wave 1102 may be too weak to detect. To further improve the range of this system, the speakers 207 and/or 208 may form an acoustic beam and that may be steered for sweeping the acoustic ranging signals in predetermined directions. Steerable acoustic beams may increase the output power acoustic signal by $N^2*P$, where N is the number of speakers and P is the output power per speaker. Information including ranges and angles associated with the obstacles 1104 in the environment may communicated to the server 102, which may integrate the information along with the positioning node positions to construct a map of the environment.

In some embodiments the acoustic ranging signals 302 may use an increased bandwidth signal to improve ranging accuracy and accuracy of the map. Mapping performed at night in the absence of people may use frequencies in the audible range without disturbing anyone. On the other hand, acoustic ranging signals 302 may be used in a mapping configuration to detect motion in the environment. A change in the received reflected signals 1102 over time may indicate motion has occurred in the mapping environment 1100. Such detection of motion indicates an intruder in the mapping environment 1100. It is noteworthy that attenuation by air and obstacles 1104 of acoustic ranging signals 302 in the audible frequency range decreases with lower frequencies.

An Electronic Article Surveillance (EAS) hard tag is a device that retailers attach to garments and other merchandise for the purpose of preventing theft. The EAS tag is typically very difficult to remove, and is generally removed from merchandise by a store clerk at the checkout stand after the merchandise is paid for. A gate at an exit of the store emits a radio wave which excites an RFID chip inside the EAS hard tag. The EAS hard tag backscatters either radio waves or acoustic waves back to the gate which detects this signal and emits an alarm to alert a store clerk of an attempted theft in progress.

FIG. 12A is a block diagram illustrating a positioning hard tag 1202, in accordance with aspects of the technology. FIG. 12B is a block diagram illustrating a positioning hard tag 1202 disposed in a positioning network 1200, in accordance with aspects of the technology. The positioning network includes one or more postioning nodes 110 and/or one or more proximity nodes 140. The positioning hard tag 1202 may enhance detection and/or location merchandise in a secured environment 1200. The hard tag 1202 of FIG. 12A includes a microphone 1204 and bi-directional radio link 1206. The position of the hard tag 1202A may be computed by hard tag 1202A, proximity nodes 140, and/or positioning nodes 110 as illustrated in FIG. 12B. Similarly, the position of the hard tag 1202B may be computed by hard tag 1202B, proximity nodes 140, and/or positioning nodes 110. The acoustic and radio signals emitted by the positioning node 110 and/or gateway node 120 and/or proximity nodes 130 may be used (as described elsewhere herein for determining a position of mobile devices 130) for calculating a position of the hard tags 1202. The hard tag 1202 may be attached to merchandise 1208 or other assets as illustrated in FIG. 12A. The merchandise attached to the hard tag 1202 may be tracked within the positioning network 1200. Since the position of the hard tag 1202 can be tracked within the positioning network 1200, there may be reduced or no need for a gate to detect when the hard tag 1202 exits the positioning network 1200 of the store. Rather a "virtual gate" 1210 may be used. The virtual gate 1210 may include a set of coordinates that the programmed into the positioning network. The positioning network 1200 may use the coordinate set determine if a hard tag 1202 is positioned within the store (e.g., hard tag 1202A) and unlikely to be exiting the store. Similarly, the positioning network 1200 may use the coordinate set determine if a hard tag 1202 is positioned beyond the virtual gate (e.g., hard tag 1202B) and likely to be exiting the store. When the hard tag 1202B reports that its position is beyond the virtual gate, the positioning network 1200 may issue an alarm, alerting store personnel.

Figure 13:
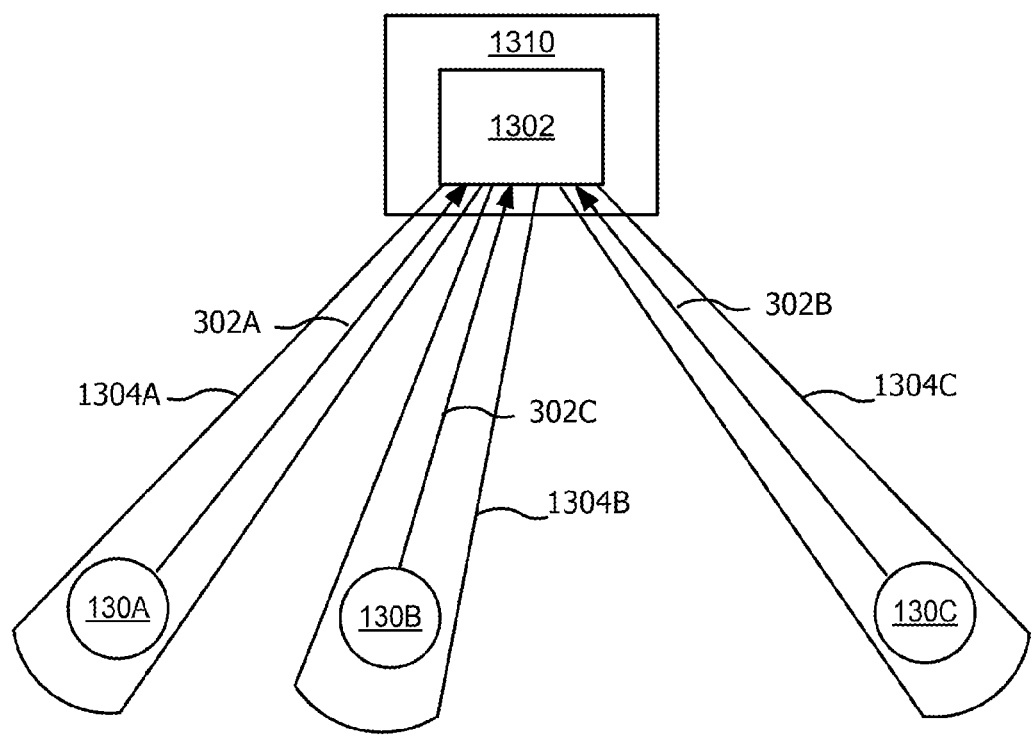
FIG. 13 illustrates an alternate embodiment for determining a position using a positioning node.

FIG. 13 illustrates an alternate embodiment for determining a position using a positioning node 1310. The positioning nodes 1310 illustrated in FIG. 13 is configured to listen for acoustic ranging signals 302 transmitted from a mobile device 130 rather than transmitting an acoustic ranging signal 302. FIG. 2B illustrate an example of such a positioning node. The embodiment illustrated in FIG. 2B has been described elsewhere herein.

A microphone array 1302 may be disposed on the positioning node 1310. FIG. 2B illustrates an example of an array of microphones 227 and 228. FIG. 10 illustrates an example of the microphone array 1002. More complex arrays of microphones 1302 may be arranged on the positioning node 1310. For example, an microphone array 1302 comprising a N×M grid of microphones may be disposed on the positioning node 1310, where N is the number of rows and M is the number of columns of microphones. In some embodiments, a microphone array 1302 comprising a circular array of microphones may be disposed on the positioning node 1310.

A mobile device 130 may transmit an acoustic ranging signal 302 to the positioning node 1310. The microphone array 1302 on the positioning node 1310 may create a virtual receive beam 1304 that may be aimed in multiple directions. Each beam 1304 may be focused to "listen" to different parts of the space surrounding the positioning node 1310. Receive beams 1304A-C illustrate directions for aiming the receive beam 1304. Receive beams 1304 may be used simultaneously. For example, acoustic ranging signals 302A-C may be detected by the microphones in the microphone array 1302 simultaneously, or near simultaneously. The microphone array 1302 may construct the receive beams 1304A-C in software to detect the positions of the respective mobile devices 130A-C. Multiple mobile devices 130 may transmit acoustic ranging signals 302 at the same time as long as the received beams 1304 that point to each mobile do not substantially overlap in space. For example, mobile devices 130A-C may transmit acoustic ranging signals 1304A-C, respectively, at the same time. If the receive beams 1304A-C do not overlap, then the positions of the mobile devices 130A-C may be detected. In some embodiments, the acoustic ranging signals 302 are each modulated by a unique pseudo-random sequence, a chirp sequence, square waves, and/or the like to provide signal separation. The unique modulation of the ranging signals 302 may be used to resolve the positions of mobile device 130 that are in overlapping receive beams 1304. An increased number of microphones disposed in the microphone array 1302 may serve to narrow the receive beams 1304, thus, increasing the number positions of mobile devices 130 that can be detected at the same time.

In this configuration, the positioning network may compute the azimuth and elevation angles of the mobile devices 130. The range may be computed using an RF signal to determine the initiation time of the acoustic signal as described elsewhere herein. The positioning node 1310 may transmit the positions of the mobile devices 130 via protocol RF information to one or more of the mobile devices 130, proximity nodes 140, gateway 120, and/or server 102. Alternatively, if one or more positions of the mobile devices 130 are known, the positioning node 1310 may receive the known positions via protocol RF information and use the position information of the mobile devices 130 to calculate the position of the positioning node 1310. In some embodiments, the mobile devices 130 may retrieve their respective positions via protocol RF information. The positioning node 1310 described in FIG. 13 may be disposed in the positioning network architecture 100 of FIG. 1 as positioning node 110, gateway node 120, mobile device 130, and/or proximity node 140. The positioning node 1310 described in FIG. 13 may be disposed in the positioning network architecture 600 of FIG. 6 as positioning node 110, mobile device 130, and/or proximity node 140. The positioning node 1310 described in FIG. 13 may be disposed in the positioning network architecture 1100 of FIG. 11 as positioning node 110 and/or gateway node 120. The positioning node 1310 described in FIG. 13 may be disposed in the positioning network architecture 1200 of FIG. 12B as positioning node 110, mobile device 130, hard tag 1202, and/or proximity node 140.

Figure 14:
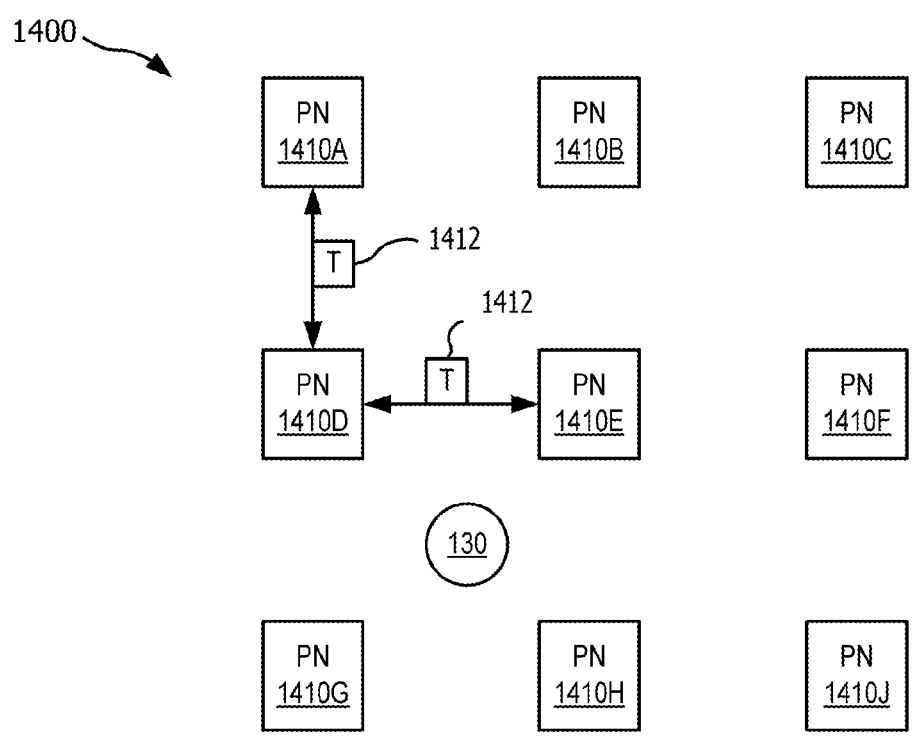
FIG. 14 is a block diagram illustrating a positioning network, in accordance with aspects of the technology.

FIG. 14 is a block diagram illustrating a positioning network 1400, in accordance with aspects of the technology. The positioning network 1400 of FIG. 14 includes a 3×3 array positioning nodes 1410A-J and a mobile device 130. However, more or fewer positioning nodes 1410 and/or mobile devices 120 may be disposed in the positioning network 1400. Each of the positioning nodes 1410A-J may comprise a positioning node 110, gateway 120, mobile device 130, proximity node 140, positioning node 1000, hard tag 1202, or positioning node 1310. The positioning network 1400 is illustrated as an array of nodes. However, the nodes may be distributed in configurations other than arrays of rows and columns, for example a random distribution.

In some embodiments, the positioning nodes 1410 are configured to operate in close proximity without a decrease in performance due to interference due to multiple simultaneous acoustic ranging signals 302 emitted from one or more of other positioning nodes 1410 in the positioning network 1400. A positioning node 1410A may be designated as a master node. The positioning nodes 1400 may periodically exchange time sync packets 1412 via RF communications to obtain rough time synchronization. Each positioning node 1410 may be configured to transmit acoustic ranging signals 302 and/or protocol RF information during a predetermined transmit window. Each transmit window may be assigned a beginning time, duration, and/or ending time. The transmit window assignment may be communicated via RF communications, e.g. protocol RF information. In some embodiments, transmit window may be configured to avoid interference between positioning nodes 1410 within a predetermined range or all the positioning nodes 1410 of the positioning network 1400.

During periods that no mobile device 130 within the positioning network 1400 is requesting a position, transmission of acoustic ranging signals 302 from the positioning nodes 1400 may be suspended to reduce the acoustic interference in the environment. The transmit window assignments for the ranging signal transmissions may be selected such that adjacent positioning nodes use different transmit windows. The master node 1410A may assign transmit windows to positioning nodes 1410A-J. In some embodiments, the master node 1410A first selects a transmit window for the master node 1410A, and then assigns transmit windows to adjacent positioning nodes 1410, e.g., positioning nodes 1410B, 1410D, and 1410E. The transmit windows may be selected to minimize interference between of the acoustic ranging signals 302 at the mobile device. 130. The number of transmit windows available may be equal to an update rate of the positioning nodes 140 divided by the duration of the ranging signal. For example, the number of transmit windows available for 1 second updates and 125 ms duration of acoustic ranging signals 302 would be about 8 transmit windows.

In some embodiments, the master node 1410A may assign a transmit window to adjacent positioning node 1410 that exchanges messages with neighbors during the transmit window, and in turn assigns transmit windows to neighboring positioning nodes 1410 which have not received a transmit window assignment. This process may continues until all positioning nodes 1410 have a transmit window assignment. For example, the master node 1410A may assign a transmit window to positioning nodes 1410B, 1410D, and 1410E. During the transmit window assigned to positioning node 1410D, positioning node 1410D may transmit acoustic ranging signals 302 for purposes of positioning. Positioning node 1410D may also communicate via RF with neighboring positioning nodes 1410E, 1401G, and 1410H and assign transmit windows to positioning nodes 1410, which have not been assigned transmit windows, e.g., positioning nodes 1410G and 1410H. Positioning node 1410H may similarly assign a transmit window to positioning node 1410J, and so on.

Positioning nodes 1410 which are in close proximity to a mobile device 130 may be assigned acoustic ranging signal codes that are about orthogonal to each other. A ranging code may be a pseudo random sequence such that an autocorrelation function of the sequence is close to 0 at all time offsets other than 0 time offset. Thus, when multiple positioning nodes 1410 transmit acoustic ranging signals at the me time, the interference resulting from acoustic ranging sequences of the various various acoustic ranging signals 302 may be minimized at the mobile device 130.

In some embodiments acoustic bandwidth is sufficient for assigning a unique carrier frequencies to each of multiple positioning nodes 1410, and thus, reduce interference. When a mobile device 130 requests a position, a responding positioning node 1410, e.g., positioning node 1410H, may transmit protocol RF information that includes information about the transmit window, acoustic ranging signal code, and carrier frequency allocated to each speakers disposed on the positioning nodes 1410H. In some embodiments, the protocol information includes the same or similar information about other neighboring positioning nodes 1410 (e.g., positioning nodes 1410D, 1410E, and/or 1410G).

In various embodiments, positioning nodes, proximity nodes, and/or mobile devices are battery powered. Battery life may be extended to maintain range of acoustic ranging signals and RF signals, increase reliability of positioning networks, reduce maintenance costs associated with replacing batteries as well as reduce the harmful impact on the environment due to battery disposal.

Figure 15:
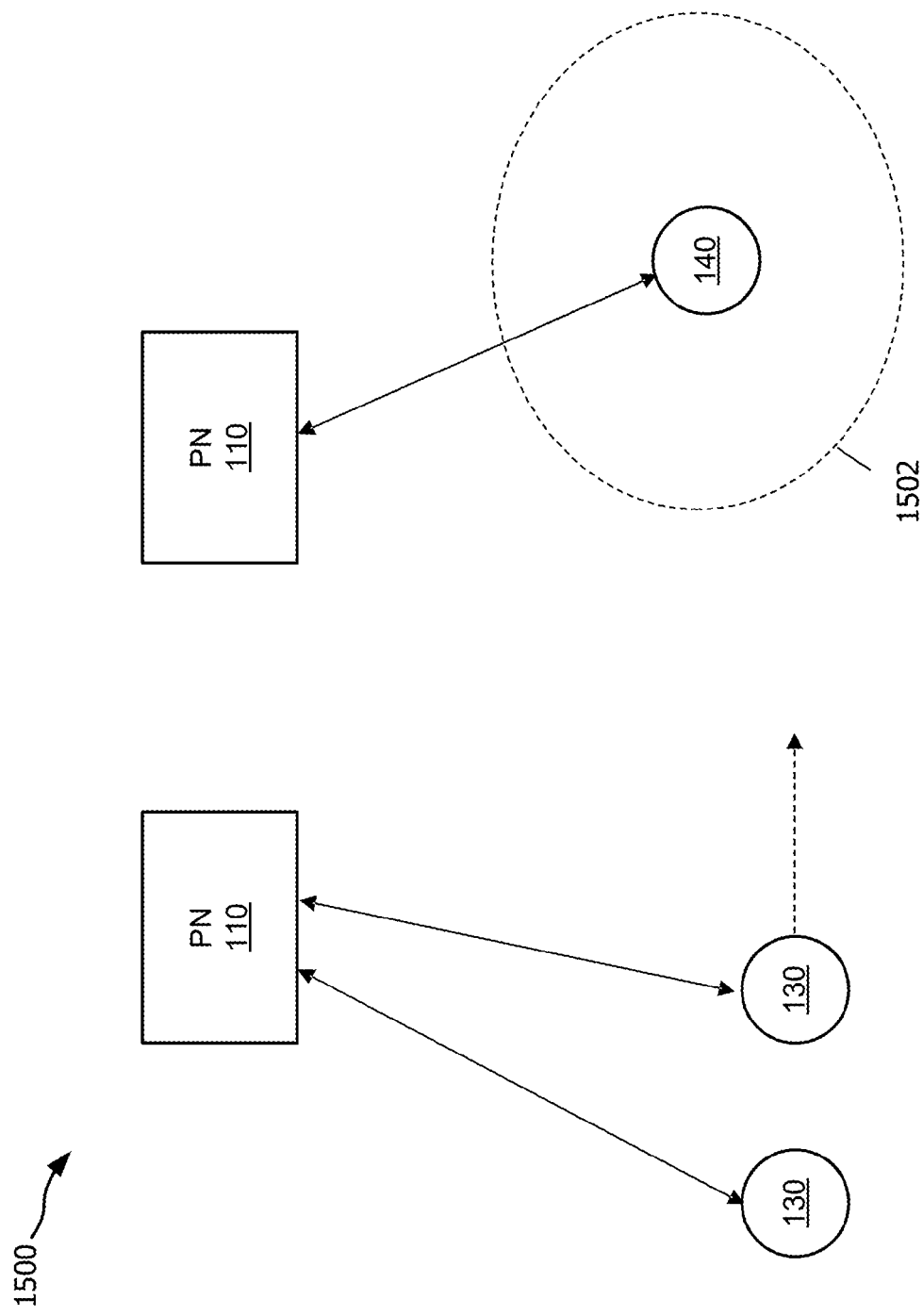
FIG. 15 is an exemplary block diagram illustrating a positioning environment including positioning nodes mounted above mobile devices, and a battery powered proximity node.

FIG. 15 is an exemplary block diagram illustrating a positioning environment including positioning nodes 110 mounted above mobile devices 130, and a battery powered proximity node 140.

Typically, the proximity nodes 140 transmit a radio beacon at a duty cycle of about 1 second. If there are no mobiles in the environment, then the proximity nodes 140 suspend transmission of the beacon, in order to conserve battery life. The proximity nodes 140 may listen for commands from the positioning nodes at a lower duty cycle, for example about every 10 seconds. The positioning node 110 may assign a duty cycle to the proximity node 140 for beacon transmission and/or reception. In some embodiments a positioning node 110 in a retail environment may instruct the proximity nodes 140 to suspend transmission and/or reception during hours when the store is closed.

Proximity nodes 140 may have a range for communication with mobile devices 130. A dotted line 1502 in FIG. 15 indicates a communication range for proximity node 140 with mobile device 130. Positioning nodes 110 optionally send a protocol RF information to the proximity nodes 140, the proximity RF information including instructions to transition to a increased duty cycle for the transmission and/or reception. The increase duty cycle may be based on proximity of mobile devices 130. In some embodiments, the increase duty cycle is based on velocity of approaching mobile devices 130 and/or estimated time for arrival of the mobile device 130 within the communication range 1502.

Figure 16:
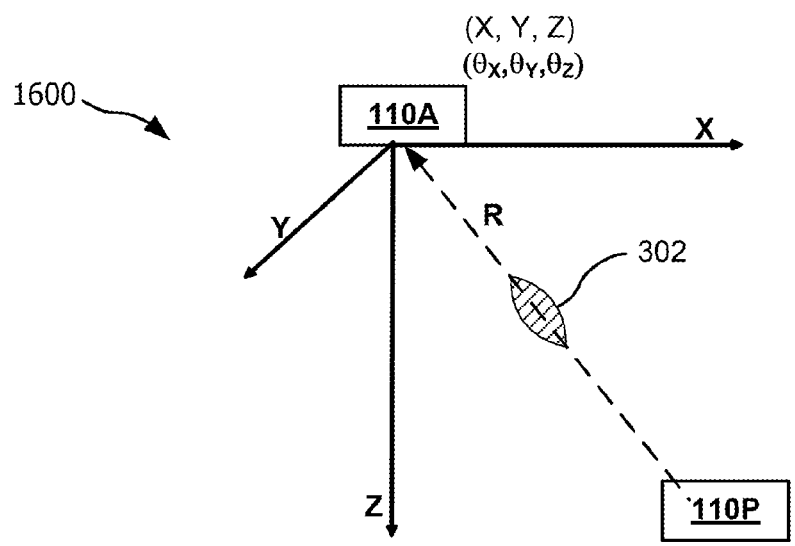
FIG. 16 is an exemplary block diagram illustrating a positioning environment 1600 including an anchor node and a positioning node 110P.
Figure 17:
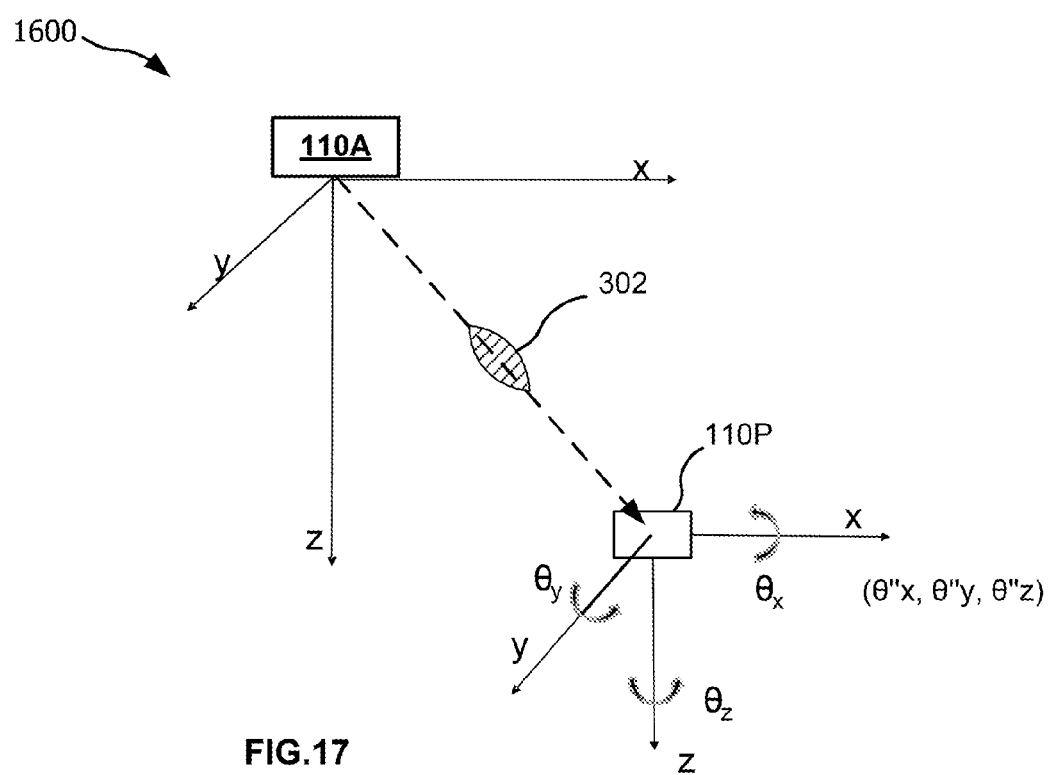
FIG. 17 is an exemplary block diagram illustrating calculation of rotational orientation of the positioning node with respect to reference coordinates of the anchor node in the positioning environment of FIG. 16.

FIG. 16 is an exemplary block diagram illustrating a positioning environment 1600 including an anchor node 110A and a positioning node 110P. FIG. 17 is an exemplary block diagram illustrating calculation of rotational orientation of the positioning node 110P with respect to reference coordinates of the anchor node 110A in the positioning environment of FIG. 16. Anchor node 110A may have a known (x,y,z) position and known orientation ($\theta x$, $\theta y$, $\theta z$) where the three angles $\theta$ are the rotation about the X,Y,Z axis. In the embodiment illustrated in FIG. 16 the components of the anchor node 110A and positioning node 110P may be configured as illustrated in FIG. 2B.

The positioning node 110P may transmit protocol RF information via the RF transceiver 209, and transmit acoustic ranging signals 302 to anchor node 110A using the speaker 226 on the positioning node 110P. The anchor node 110A may receive the acoustic ranging signals 302 using location microphones 227 and 228 to compute the (X,Y,Z) position of the positioning node 110P using the time of flight measurements and angle of arrival measurements, as described elsewhere herein.

The anchor node 110P may transmit protocol RF information via the RF transceiver 209, the protocol RF information including the (x,y,z) position of the positioning node 110P. The Anchor node may transmit acoustic ranging signals 302 to positioning node 110A using the speaker 226 on the anchor node 110A.

The positioning node 110A may receive the acoustic ranging signals 302 using location microphones 227 and 228 to compute the arrival angle ($\theta'x$, $\theta'y$, $\theta'z$) of the acoustic ranging signal 302 from the anchor node 110P. The arrival angle (θ'x, θ'y, θ'z) of the acoustic ranging signal 302 from the anchor node 110P may be used to calculate the orientation angle (θ"x, θ"y, θ"z) of the positioning node 110P.

In some embodiments, two angles of the orientation angle (θ"x, θ"z) for the positioning node 110P may be estimated using a two axis accelerometer where the accelerometer is configured to detect gravitational forces parallel to the Y (vertical) axis.

When the positioning node is located along the X, Y or Z axis of the coordinate system of the anchor node 110A A tilt relative to that axis is difficult to detect using the microphones 227 and/or 228. However, when the positioning node is located along the either the X or Z axis, the two axis accelerometer may be used to estimate those angles.

In the case where the positioning node 110P is located along the Y axis of the anchor node 110A, the two axis accelerometer may not be useful in estimating a rotation about the Y axis, since sensing gravity that is parallel to the Y axis does not provide any information about rotation about the Y axis. However, the position of the positioning node 110P as calculated by the anchor node 110A detect would indicate that the positioning node 110P is positioned along the Y axis. In such case a different anchor node 110 may be used for calculating rotation of the positioning node 110P about the Y axis.

In some embodiments, the accuracy of the estimated the rotation of the positioning node 110P about the X, Y and Z axis of the anchor node 110A may degrade as the positioning node 110P approaches the respective axis. A different positioning node may be used for calculating position that has a better geometry in the cases where the positioning node gets closer to the X, Y, or Z axis.

The calculated (x,y,z) position and the orientation angle (θ"x, θ"y, θ"z) of the positioning node 110P may be used by the positioning node 110P (functioning as an anchor node) to calibrate a position and orientation of a neighboring positioning node 110 in a similar manner as described above.

As noted above, the description of an exemplary procedure for measuring position and rotational orientation of the positioning node 110P with respect to the axis of the anchor node 110A is described with reference to a positioning node 110P and anchoring node 110A as illustrated in FIG. 2B. However, in some embodiments, the components of the anchor node 110A and positioning node 110P may be configured as illustrated in FIG. 2A. The description above of a procedure for measuring position and rotational orientation of the positioning node 110P with respect to the axis of the anchor node 110A may also be understood for an anchor node 110 illustrated in FIG. 2A, by reference to the descriptions of the use of the positioning node 110 as illustrated in FIG. 2A for measuring position and angle of arrival, as described elsewhere herein.

Figure 18:
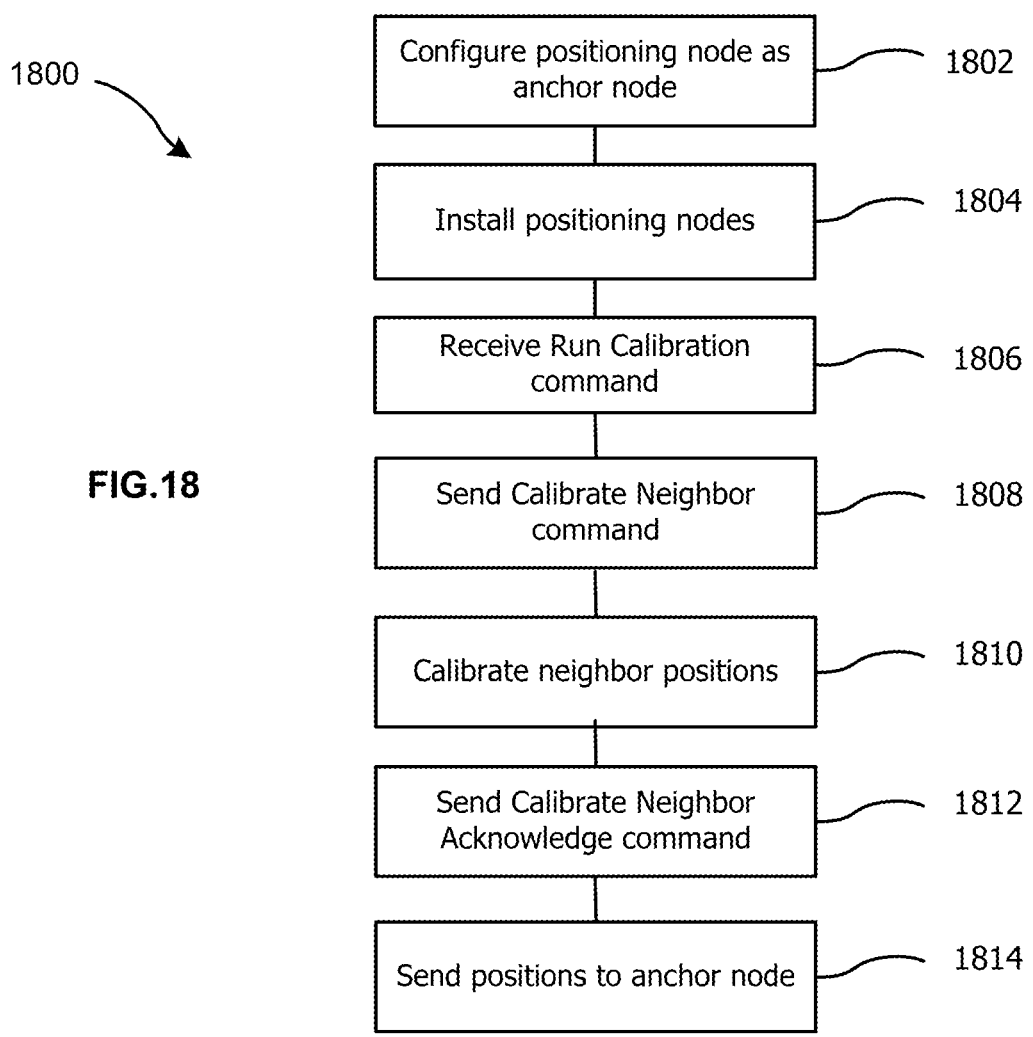
FIG. 18 illustrates a method for network calibration. The network calibration method may be understood with reference to FIG. 14.

FIG. 18 illustrates a method 1800 for network calibration. The network calibration method 1800 may be understood with reference to FIG. 14. In step 1802, a positioning node (e.g., positioning node 1410A) is configured as an anchor node. The anchor node's position may be precisely measured and configured.

In step 1804, additional positioning nodes may be installed (e.g., positioning nodes 1410B-1410J). The installed positioning nodes may have short range radio transceivers. Thus, not all of the positioning nodes 1410A-1410B are in communication range with all other positioning nodes in the network 1400.

In step 1806, a positioning node that has been previously calibrated (e.g., positioning node 1410B) receives a Run Calibration command containing an identifier of the positioning node 1410B. The positioning node 1410B may begin executioner of position calibration in response to receiving its identifier related to a Run Calibration command.

In step 1808, the positioning node 1410B may send a Calibrate Neighbor message via both the RF transceiver 209 and a speaker (e.g., one or more of speaker 207, 208, or 226). Positioning nodes 1410C, 1410D, 1410E, and 1410F may be within range to receive both the RF and acoustic Calibrate Neighbor message.

In step 1810, positioning nodes within acoustic range of positioning node 1410B that have not already been calibrated using a shorter number of hops to the anchor node 1410A may calibrate their positions using calibration node 1410B. For example, positioning nodes 1410D and 1410E are with a single hop to anchor node 1410A. However, positioning nodes 1410C and 1410F are at least two hops from anchor node 1410A. Thus, the positioning nodes 1410C and 1410F may exchange acoustic ranging signals and RF signals for calibration of the positions of the positioning nodes 1410C and 1410F as described elsewhere herein. The positioning nodes 1410D and 1410E may ignore the Calibrate Neighbor messages.

At step 1812, the positioning nodes 1410C and 1410F may send a Calibrate Neighbor Acknowledge message to the positioning node 1410B via a RF and/or acoustic message, while the positioning nodes 1410D and 1410E ignore the Calibrate Neighbor messages. The Calibrate Neighbor Acknowledge may include an identification field and a position field for the node 1410C (and 1410F) that was calculated in step 1810 in response to the Calibrate Neighbor message.

At step 1814, the calibration node 1410E forwards the calculated positions of the neighboring positioning nodes 1410C and 1410F, either direct or via the network to the anchor node 1410A.

In some embodiments, the calibration of the positioning nodes 1410 may be performed at least one time for each of the positioning nodes, beginning with the anchor node 1410A. The network calibration flow may be comprised of multiple sequential executions of the neighbor positioning nodes 1410; one neighbor calibration flow for each positioning node 1410 in the network 1400 starting with the anchor node 1410A. The execution order of these neighbor calibrations is also controlled by the anchor node 1410A in the network 1400 to control how execution is performed sequentially in time and to avoid conflicts. The anchor node 1410A may maintain and update a tree of identifiers for the positioning nodes 1410 as each step in the execution of the neighbor calibration proceeds. In a breadth first fashion, the anchor node 1410A may send Run Calibration commands via the network 1400 to every positioning node 1410 in the network 1400 until all positioning nodes 1400 have been calibrated. A resulting tree of positioning nodes 1410 and positions within the network 1400 of the respective positioning nodes 1410 may be forwarded by the anchor node 1410A to the server 102, via the RF transceiver 104 and/or the network 106.

There may be a substantial overhead in time for routing Run Calibration messages and Run Calibration Acknowledge messages through neighbor positioning nodes 1410 up and down the tree in which the RF of the positioning nodes 1410 have relatively short ranges. In some embodiments, all the positioning nodes 1410 are within RF communication range with the anchor node 1410A. The Run Calibration commands from the anchor node 1410A may be transmitted and heard directly by the addressed positioning nodes 1410A-1410J. The Run Calibration Ack messages may be sent from the responding positioning nodes 1410B-1410J directly back to the anchor node 1410A without the need for message forwarding.

FIG. 19 illustrates an exemplary computing device 1900 that may be used to implement an embodiment of the present systems and methods. The system 1900 of FIG. 19 may be implemented in the contexts of the likes of computing devices, networks, servers, positioning/anchor nodes, 110, gateway nodes 120, mobile nodes 130, proximity nodes 140, or combinations thereof. The computing device 1900 of FIG. 19 includes one or more processors 1910 and main memory 1920. Main memory 1920 stores, in part, instructions and data for execution by processor 1910. Main memory 1920 may store the executable code when in operation. The system 1900 of FIG. 19 further includes a mass storage device 1930, portable storage device 1940, output devices 1950, user input devices 1960, a display system 1970, and peripheral devices 1980, anti aliasing module 1982, and signal processor 1984, (e.g., the signal processor 400).

The components shown in FIG. 19 are depicted as being connected via a single bus 1990. The components may be connected through one or more data transport means. Processor unit 1910 and main memory 1920 may be connected via a local microprocessor bus, and the mass storage device 1930, peripheral device(s) 1980, portable storage device 1940, display system 1970, peripheral devices 1980, may be connected via one or more input/output (I/O) buses.

Mass storage device 1930, which may be implemented with a magnetic disk drive, solid state disk, or an optical disk drive, is a non-volatile storage device for storing data and instructions for use by processor unit 1910. Mass storage device 1930 may store the system software for implementing embodiments of the present technology for purposes of loading that software into main memory 1920.

Portable storage device 1940 operates in conjunction with a portable non-volatile storage medium, such as a floppy disk, compact disk, digital video disc, solid state disk, or USB storage device, to input and output data and code to and from the computer system 1900 of FIG. 19. The system software for implementing embodiments of the present technology may be stored on such a portable medium and input to the computer system 1900 via the portable storage device 1940.

User input devices 1960 provide a portion of a user interface. User input devices 1960 may include an alphanumeric keypad, such as a keyboard, for inputting alphanumeric and other information, or a pointing device, such as a mouse, a trackball, stylus, or cursor direction keys. Additional user input devices 1960 may comprise, but are not limited to, devices such as acoustic receivers (e.g., location microphones 227, 228 and 206), RF receivers, temperature sensors, accelerometers, and gyros, speech recognition systems, facial recognition systems, motion-based input systems, gesture-based systems, and so forth. For example, user input devices 1960 may include a touch screen. Additionally, the system 1900 as shown in FIG. 19 includes output devices 1950. Suitable output devices include acoustic speakers (e.g., location speakers 207, 208, and 226), RF transmitters (e.g., RF transceiver 209), printers, network interfaces, and monitors.

Display system 1970 may include a liquid crystal display (LCD) or other suitable display device. Display system 1970 receives textual and graphical information, and processes the information for output to the display device.

Peripherals device(s) 1980 may include any type of computer support device to add additional functionality to the computer system. Peripheral device(s) 1980 may include a modem or a router. In various embodiments, peripheral devices 1980 include cameras, video cameras, illumination sources, bar code readers, RFID sensors, robotic arms, magnetic sensors, capacitance sensors, infrared sensors, UV sensors, RF transceivers, audio transmitters, audio receivers, gyros, accelerometers, temperature sensors, atmospheric pressure sensors, and/or the like.

An anti-aliasing module 1982 is configured to is to receive data representing multiple acoustic ranging signals that have been emitted and detected using a combination speakers and microphones, and to resolve the ambiguity between calculated angles of arrival using the received data, as described in more detail elsewhere herein.

One or more components provided in the computer system 1900 of FIG. 19 are those typically found in computer systems that may be suitable for use with embodiments of the present technology and are intended to represent a broad category of such computer components that are well known in the art. Components may be added or omitted from the computer system 1900 of FIG. 19 without departing from the spirit and scope of the technology. Thus, the computer system 1900 of FIG. 19 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for determining an angle between a positioning node and a secondary device, the system comprising:
   a first acoustic transducer disposed along a first axis of the positioning node and coupled to a first acoustic ranging signal that is modulated using a first ranging sequence, the first acoustic transducer configured to transmit the first acoustic ranging signal to the secondary device;
   a second acoustic transducer disposed along the first axis of the positioning node and coupled to a second acoustic ranging signal that is modulated using a second ranging sequence, the second acoustic transducer configured to transmit the second acoustic ranging signal to the secondary device;
   an acoustic receiver disposed on the secondary device and configured to detect the first and second acoustic ranging signals;
   a signal processor configured to calculate a phase difference between the first and second acoustic ranging signals using the first and second acoustic ranging sequences, and to calculate a time of arrival of the first and second acoustic ranging signals; and
   an anti-aliasing module configured to calculate a plurality of aliased angles of arrival using the calculated phase difference, and to determine the angle between the positioning node and the secondary device from the plurality of angles of arrival using a difference between the time of arrival of the first and second acoustic ranging signals.

2. The system of claim 1, wherein the signal processor and anti-aliasing module are disposed on the secondary device.

3. The system of claim 1, further comprising:
   a radio transmitter coupled to the positioning node and configured to transmit a timing signal to the secondary device; and
   a radio receiver disposed on the secondary device and configured to detect the timing signal, the signal processor further configured to calculate time of flight of the first and second acoustic ranging signals using the timing signal and the time of arrival of the first and second acoustic ranging signals.

4. The system of claim 3, wherein the signal processor is further configured to calculate a distance of the secondary device from the position node using the timing signal.

5. The system of claim 3, wherein the radio transmitter and receiver are Bluetooth compatible.

6. The system of claim 1, further comprising a radio receiver disposed on the secondary device and configured to receive information for use by the secondary device.

7. The system of claim 6, wherein the received information includes at least one of positioning node identification number, acoustic ranging signal description, or ranging signals.

8. The system of claim 1, further comprising a radio transmitter configured to send information describing the first acoustic ranging signal and the second acoustic ranging signal.

9. The system of claim 1, further comprising a radio transmitter disposed on the secondary device and configured to transmit a timing signal for use at the positioning node.

10. The system of claim 9, further comprising a distance measuring module configured to use the timing signal for calculating a distance to the secondary device from the position node.

11. The system of claim 1, further comprising a radio transmitter disposed on the secondary device and configured to transmit information for use by the anti-aliasing module, the transmitted information including the calculated phase difference and the time of arrival of the first and second acoustic ranging signals.

12. The system of claim 1, further comprising a radio transmitter disposed on the secondary device and configured to transmit information for use by the anti-aliasing module, the transmitted information including the calculated phase difference between the first and second acoustic ranging signals.

13. The system of claim 1, further comprising a radio transmitter disposed on the secondary device and configured to transmit information for use by the anti-aliasing module, the transmitted information including the time of arrival of the first and second acoustic ranging signals.

14. The system of claim 1, further comprising:
an encoder disposed on the secondary device and configured to encode received acoustic ranging signals from the first and second transducers; and
a radio transmitter disposed on the secondary device and configured to transmit encoded acoustic ranging signals for use by signal processor to calculate the phase difference and the time of arrival of the first and second acoustic ranging signals.

15. The system of claim 1, further comprising a radio transmitter disposed on the secondary device and configured to transmit information for use by signal processor to calculate the phase difference and the time of arrival of the first and second acoustic ranging signals.

16. The system of claim 1, wherein the secondary device is a mobile phone.

17. The system of claim 1, wherein the secondary device is a robot.

18. The system of claim 1, further comprising a third acoustic transducer disposed on the positioning node along a second axis of the positioning node and coupled to a third acoustic ranging signal that is modulated using a third ranging sequence, the third acoustic transducer configured to transmit the third acoustic ranging signal to the secondary device,
the signal processor further configured to calculate a second phase difference between the third acoustic ranging signal and the second acoustic ranging signal, and to calculate a time of arrival of the third acoustic ranging signal, and
the anti-aliasing module further configured to determine an angle in the second axis between the positioning node and the secondary device using the calculated second phase difference and a difference between the time of arrival of the third acoustic ranging signal and the second acoustic ranging signal.

19. A positioning device comprising:
an acoustic receiver configured to receive a first ranging signal from a first transducer, the first ranging signal modulated using a first sequence, the acoustic receiver also configured to receive a second ranging signal from a second transducer, the second ranging signal modulated using a second sequence;
a signal processor configured to use first and second sequence to calculate a phase difference between the first and second ranging signals, and to calculate a time of arrival of the first and second ranging signals; and
an anti-aliasing module configured to calculate an angle between the positioning device and a first axis referenced to the first and second transducer using the phase difference and the time of arrival of the first and second ranging signals.

20. The positioning device of claim 19:
wherein the acoustic receiver is further configured to receive a third ranging signal from a third transducer, the third ranging signal modulated using a third sequence, the third transducer disposed along a second axis between the third and second transducer;
wherein the signal processor is further configured to use the third and second sequence to calculate a second phase difference between the third and second ranging signals, and to calculate a time of arrival of the third ranging signal; and
wherein the anti-aliasing module is further configured to calculate an angle in the second axis between the positioning device and the second axis using the second phase difference the time of arrival of the third and second ranging signals.

21. The positioning device of claim 19, further comprising:
a radio receiver disposed on the positioning device and configured to detect a timing signal; and
a distance module configured to calculate time of flight of the first ranging signal using the timing signal and the time of arrival of the first ranging signal, for determining a distance between the positioning device and the first transducer.

22. The positioning device of claim 19, further comprising a radio transmitter disposed on the positioning device and configured to transmit received data for use by the signal processor.

23. A system including a plurality of positioning nodes, each positioning node comprising:
a first acoustic transducer configured to transmit a first acoustic ranging signal that is modulated using a first ranging sequence;
a second acoustic transducer configured to transmit a second acoustic ranging signal that is modulated using a second ranging sequence;
an acoustic receiver configured to detect a first and second ranging signals from another positioning node;
a radio transceiver configured to send and receive radio signals for communication with the another positioning node;
a signal processor configured to use the first and second acoustic ranging sequences to calculate a time of arrival of the detected first and second acoustic ranging signals and a phase difference between the first and second acoustic ranging signals, the signal processor further configured to calculate a plurality of aliased angles of arrival using the calculated phase difference;

an anti-aliasing module configured to use a difference between the time of arrival of the first and second acoustic ranging signals to select an angle of arrival from the plurality of aliased angles of arrival; and a position processor configured to use a difference between a time of arrival of radio signals received from the another positioning node and the time of arrival of the first and second acoustic ranging signals to calculate a distance to the another positioning node, the position processor further configured to calculate a position of the positioning node relative the another positioning node using the calculated distance and angle of arrival.

24. The system of claim 23, further comprising a third acoustic transducer configured to transmit a third acoustic ranging signal that is modulated using a third ranging sequence.

25. The system of claim 23, wherein the secondary device is at least one of a barcode reader, a RFID reader, a merchandise tracking device, an electronic price label, and a laptop computer.

26. A method for determining an angle between a positioning node and a secondary device, the method comprising:

receiving at an acoustic receiver on the secondary device a first ranging signal from a first transducer disposed on the positioning node, the first ranging signal having a first acoustic sequence;

receiving at the acoustic receiver a second ranging signal from a second transducer disposed on the positioning node using, the second ranging signal having a second acoustic sequence;

calculating a phase difference between the first and second ranging signal based on the first and second acoustic sequence, the phase difference calculated using a signal processor;

calculating a time of arrival of the first and second acoustic ranging signals using the signal processor;

calculating a plurality of potential angles between the secondary device and a first axis of the positioning node, the plurality of potential angles based on the calculated phase difference; and selecting an angle from the plurality of potential angles using a difference between the calculated time of arrival of the first and second ranging signals.

27. The method of claim 26, further comprising:

receiving a third ranging signal from a third transducer the third ranging signal having a third acoustic sequence;

calculating a phase difference between the third and second ranging signal based on the third and second acoustic sequence, the phase difference calculated using the signal processor;

calculating a time of arrival of the third acoustic ranging signals using the signal processor;

calculating a plurality of potential angles between the secondary device and a second axis of the positioning node, the plurality of potential angles based on the calculated phase difference between the third and second ranging signal; and selecting an angle in the second axis from the plurality of potential angles using a difference between the calculated time of arrival of the third and second ranging signals.

28. The method of claim 26, further comprising:

encoding the received first and second received ranging signals for transmission via a radio signal; and transmitting the encoded ranging signals for use by the signal processor.

29. The method of claim 26, further comprising:

receiving a radio signal at the secondary device, the radio signal including a time data;

calculating time of flight of the first ranging signal using the timing signal and the time of arrival of the first ranging signal; and calculating a distance between the secondary device and the positioning node based on the calculated time of flight.

30. The method of claim 26, further comprising receiving a radio signal at the secondary device, the radio signal including information about the received first and second received ranging signals.

* * * * *